United States Patent [19]
Goto et al.

[11] Patent Number: 5,801,911
[45] Date of Patent: Sep. 1, 1998

[54] ELECTRIC COMPRESSOR DRIVING APPARATUS FOR AUTOMOBILE

[75] Inventors: Naomi Goto, Kurita-gun; Makoto Yoshida, Kusatsu, both of Japan

[73] Assignee: Matsushita Electric Industrial Co., Ltd., Osaka-fu, Japan

[21] Appl. No.: 560,769

[22] Filed: Nov. 21, 1995

[30] Foreign Application Priority Data

Dec. 6, 1994 [JP] Japan .................. 6-302037

[51] Int. Cl.[6] .................................................. H02H 7/00
[52] U.S. Cl. .................. 361/22; 361/23; 361/78; 361/115
[58] Field of Search .................. 361/20, 21, 22, 361/23, 78, 93, 115

[56] References Cited

U.S. PATENT DOCUMENTS 5,428,967  7/1995  Goto .................................. 323/901

*Primary Examiner*—Jeffrey A. Gaffin
*Assistant Examiner*—Stephen W. Jackson
*Attorney, Agent, or Firm*—Panitch Schwarze Jacobs & Nadel, P.C.

[57] ABSTRACT

A comparison voltage which is stepwise changed by control of a microcomputer through photocouplers is compared with a voltage of a direct-current power supply, and a signal of comparison result is given to the microcomputer through a photocoupler. The voltage of the direct-current power supply is detected on the basis of the comparison voltage when the signal of the comparison result changes.

20 Claims, 17 Drawing Sheets

ELECTRIC COMPRESSOR DRIVING APPARATUS FOR AUTOMOBILE

FIELD OF THE INVENTION AND RELATED ART STATEMENT

1. Field of the Invention

The present invention relates to an electric compressor dividing apparatus for an automobile provided with a voltage detection circuit for detecting a voltage of a direct-current power supply of an electric compressor.

2. Description of the Related Art

FIG. 13 shows a circuit of a conventional electric compressor driving apparatus 19 to drive an electric compressor for air conditioning in an electric automobile in which a motor of the electric compressor is a three-phase induction motor and the electric compressor driving apparatus comprises an inverter, for example.

Referring to FIG. 13, a high voltage batteries 1 of about 380 volts for a driving motor of the electric automobile, a low voltage battery 16 of about 12 volts or 24 volts for electrical equipments, an electric compressor 20 and a controller 21 are connected to the electric compressor driving apparatus 19. The controller 21 controls the electric compressor driving apparatus 19. Since the electric compressor 20 requires a large electric power, it is driven by electric power of the high voltage batteries 1 for the driving motor.

For the safeties' sake, circuits connected to the low voltage battery 16 for the electrical equipments are electrically isolated from circuits connected to the high voltage batteries 1 for the driving motor.

The electric compressor driving apparatus 19 comprises two voltage detection circuits, a high voltage detection circuit 22 and a low voltage detection circuit 23. When the high voltage detection circuit 22 detects that the voltage of the batteries 1 is higher than a normal voltage, a signal is transmitted through an isolation device 26 to a control circuit 25 which is operated by an electric power of the battery 16. On the other hand, when the low voltage detection circuit 23 detects that the voltage of the batteries 1 is lower than the normal voltage, a signal is transmitted through an isolation device 29 to the control circuit 25. In both instances of the above-mentioned cases, operation of the motor driving circuit 24 is suspended by ceasing issuances of output of the signal of the control circuit 25 which operates the motor driving circuit 24 through an isolation device 27, and the motor driving circuit 24 is protected from abnormal heating due to an excessive voltage or an insufficient voltage.

The conventional electric compressor driving apparatus 19 further comprises a voltage range detection circuit 28, by which the voltage of the batteries 1 is roughly determined a high voltage, a middle voltage, a low voltage, etc. thereby to apply a determination signal to the control circuit 25 through an isolation device 30. The operation of the motor driving circuit 24 is adjusted by the determination signal. Consequently, as shown by waveform diagrams of motor driving voltages in FIG. 15A, FIG. 15B and FIG. 15C, the waveform of the motor driving voltage is changed responding to the voltage $V_{DC}$ of the batteries 1, and the motor driving circuit 24 is protected from occurrence of damage owing to current increase caused by overexcitation or underexcitation.

The motor driving voltage is a pseudo AC voltage of 100V (effective value) and applied to a motor of the electric compressor 20.

FIG. 14 shows an example of the voltage detection circuit in the prior art having the high voltage detection circuit 22, the low voltage detection circuit 23 and the voltage range detection circuit 28.

In the above-mentioned voltage detection circuit, the voltage of the batteries 1 is divided by respective pairs of dividing resistors pairs 22A & 22B, 23A & 23B, 28A & 28B in order to lower the high voltage of the batteries 1. Large electric power is consumed in the dividing resistors 22A - - - 28B and a lot of heat is generated. Therefore, large size resistors must be used.

Since many circuits, e.g., the high voltage detection circuit 22, the low voltage detection circuit 23 and the voltage range detection circuit 28 must be mounted in the prior art, a large circuit-mounting space is needed, the number of parts increases and heat generation increases.

In the voltage range detection circuit 28, since the the voltage is roughly detected by using comparators, accuracy in voltage detection is not satisfactory for prevention of increase of current caused by the overexcitation or the underexcitation by varying the waveform in dependence on the voltage of the batteries 1. Accordingly, there has been a demand that the voltage detection is carried out with a high accuracy. Furthermore, in the voltage range detection circuit 28 of the prior art, it was difficult to detect in a large voltage range.

OBJECT AND SUMMARY OF THE INVENTION

An object of the present invention is to provide an electric compressor driving apparatus for an automobile which can detect a voltage of a motor driving power supply with a high accuracy and is applicable to a wide range of the voltage.

In a first mode of the present invention, voltage detection means detects a first direct-current voltage of first direct-current voltage generation means corresponding to first voltage source means, by computing a divided voltage of the first direct-current voltage and an adjustable comparison voltage with electrically isolated computer means. The comparison voltage is adjustable by adjusting a gain of a voltage amplifier, which is for amplifying a predetermined reference voltage, in isolated state by a photocoupler, and the comparison result is detected in isolated state by another photocoupler.

In a second mode of the present invention, the gain of the voltage amplifier in the first mode is adjusted by changing a ratio between two resistance values. The change of the ratio of the two resistance values is carried out by changing one resistance value; the one resistance value is changed by selecting one or more resistors and connecting selected two or more resistors in parallel, each resistance value of the two or more resistors being given by the n-th power of 2 ($_2$n, n: natural number).

In a third mode of the present invention, on top of the feature of the second mode, the change of composite resistance value is made by selectively connecting two or more resistors in parallel. The connection is made by using a counter which outputs a binary number of a predetermined number of digit by input of a clock signal and is reset by input of a reset signal.

In a fourth mode of the present invention, a comparison operation in the computer means of the first mode is performed, by limiting an adjusting range of the gain of the voltage amplifier, and with a time interval determined for protection of the circuits in the electric compressor driving apparatus and the electric compressor.

In a fifth mode of the present invention, the voltage detections means detects the first direct-current voltage by comparison operation of the divided voltage of the first direct-current voltage with an adjustable comparison voltage by the electrically isolated computer means. The comparison voltage is adjusted through adjustment of the gain of the voltage amplifier, which is for amplifying the predetermined reference voltage, and also adjusted by input of the clock signal. The gain and the comparison result are detected in isolated state by the photocoupler.

In a sixth mode of the present invention, on top of the features of the first and fifth modes, the electric power of the voltage detection means is supplied in isolated state from a second direct-current voltage generation means corresponding to second voltage source means.

In a seventh mode of the present invention, on top of the features of the first and fifth modes, when the output of the first direct-current voltage generation means lowers and the power supply of the comparator and the voltage amplifier is suspended, a signal of the comparison result between the divided voltage of first direct-current voltage and the comparison voltage is output thereby to indicate that the output of the first direct-current voltage generation means is zero.

In a eighth mode of the present invention, on top of the features of the first and fifth modes, the voltage amplifier comprises a variable resistor for varying the reference voltage and a variable resistor for varying the gain, and parts of the circuit of the voltage detection means except the computer means are mounted on one substrate having terminals for circuit connection.

According to the first mode of the present invention, the voltage detections means detects the first direct-current voltage, by carrying out a comparison between the divided voltage of the first direct-current voltage and the comparison voltage, changing the comparison voltage. When the output of comparison result reverses in the course of comparison changing the comparison voltage, the divided voltage is determined substantially equal to the comparison voltage. Therefore, the first direct-current voltage is detected by performing the operation for dividing the comparison voltage by a divided ratio in the computer means.

Change of the comparison voltage is carried out by changing the gain of the voltage amplifier.

In the computer means, the adjustment of the gain and the detection of the comparison result are performed through respective photocouplers. Therefore, the computer means is isolated with respect to the circuit of the first direct-current voltage generation means.

Moreover, since the first direct-current voltage itself is detected, a high accuracy is assured, and the waveform of the motor driving voltage can be varied depending on the first direct-current voltage in a wide voltage range. Consequently, increase of current due to overexcitation or underexcitation can be prevented.

The power source voltage of the comparator and the voltage amplifier is selected to a relatively high voltage, and thereby, the divided voltage and the comparison voltage are selected to respective relatively high voltages. Consequently, operation of the voltage detection means is not much influenced by electric noise. Therefore, the apparatus of the present invention is suitable for voltage detection means for electric compressor driving apparatus, which generates large electric noises.

According to the second mode of the present invention, the gain of the voltage amplifier is adjusted by changing a ratio between two resistance values in the first mode. Therefore, the gain is adjusted by changing one of two resistance values.

The one of two resistance values can be changed by selecting two or more resistors from plural resistors having respective resistance values of the n-th power of 2 ($2^n$, n: natural number) and connecting them mutually in parallel. By using two or more resistors of resistance values of the n-th power of 2, the ratio between two resistance values can be changed with fine variation steps. The number of the variation steps is represented by the R-th power of 2 i.e.($2^R$, R designates the number of resistors).

Since the accuracy of detection of the first direct-current voltage is improved depending on R-th power of 2 by increase of only the number of the resistors, the accuracy of detection is improved without great increase of a space for the circuit.

According to the third mode, on top of the feature of the second mode, the counter is used to issue the output signals representing a binary number of a predetermined number of digit upon inputs of clock signals. The resistance values are changed on the basis of the output signals of the counter. Since the ratio between the resistance values is changed responding to the number of the clock signals, the resistance values can be changed with the fine variation steps even if a small number of resistors are used. Therefore, the number of the output ports of the computer means is reduced, and moreover, operation program of the computer means is simplified.

In order to repeat measurement of the first direct-current voltage, the reset signal is inputted to the counter after every measurement. The outputs of the counter are set to an initial state, and measurement is repeated.

According to the fourth mode of the present invention, on the top of the feature of the first mode, comparison operation in the computer means is carried out by limiting the adjustment range of the gain of the voltage amplifier. The comparison operation is carried out with a predetermined longest time interval required to protect the circuit in the electric compressor driving apparatus and the electric compressor. Generally, in order to protect the circuit, the time interval of the comparison operation in the computer means is preferably as short as possible. However, when the first direct-current voltage is within a normal range, the comparison operation can be carried out at long time intervals. The measurement range of the first direct-current voltage is limited in compliance with requirement. When the first direct-current voltage is not within the normal range, the measurement is repeated at short intervals. Consequently, the high measuring speed is compatible with the wide measurement range.

According to the fifth mode, the gain adjustment is attained by inputting the clock signal. The gain and the output of the comparison result are detected by the computer means in isolated state by the photocoupler. The comparison voltage is calculated in the computer means on the basis of (i) the gain of the voltage amplifier when the comparison result reverses, and (ii) a predetermined reference voltage. Moreover, the first direct-current voltage is detected by dividing the comparison voltage by the dividing ratio.

The first direct-current voltage itself is detected. The output port of the computer means is not needed, and furthermore, the operation program thereof is simplified.

According to the sixth mode of the present invention, on top of the features of the first and fifth mode, the electric power of the comparator and the voltage amplifier is supplied from the second direct-current voltage generation means in electrically isolated state. Therefore, when the second direct-current voltage generation means is activated, the voltage detection means starts operation and the first direct-current voltage is immediately measured.

Because the first direct-current voltage generation means is for the running motor, its output voltage, namely the first direct-current voltage largely fluctuates. When an abnormally high voltage is generated by a regenerative breaking for example, circuit protection means can immediately activated in order to protect adverse influence of the high voltage. In the case that the electric power for the comparator and the voltage amplifier is supplied from the first direct-current voltage generation means, when the first direct-current voltage abnormally lowers by overload in an acceleration step, the comparator and the voltage amplifier are liable to be inoperative due to unstable power supply. The comparator and the voltage amplifier are normally operated when the electric power is supplied from the second direct-current voltage generation means.

According to the seventh mode, on top of the features of the first and fifth modes, the signal of the comparison result is transmitted through the photocoupler, thereby the polarity of the signal of the comparison result can be made positive or negative. Therefore, in the case that the output voltage of the first direct-current voltage generation means lowers and the power supply to the comparator and the voltage amplifier is suspended, the signal of the comparison result is output so that a fall of the output voltage of the first direct-current voltage generation means is indicated.

In the case that the output voltage of the first direct-current voltage generation means lowers and the power supply to the comparator and the voltage amplifier is suspended, the signal of the comparison result which is for indicating an increase of the output voltage of the first direct-current voltage generation means is not output. Therefore, the above-mentioned configuration works as a fail-safe system and erroneous operation is prevented.

According to the eighth mode of the present invention, on top of the features of the first and fifth modes, the resistor for changing the reference voltage and one of the resistors for changing the gain of the voltage amplifier are made variable, and the circuits of the voltage detection means except the computing circuit is mounted on the substrate having the terminals to be connected to an external circuit. Therefore, even when the resistance which is to be changed to vary the ratio is already fixed, a measurement range of the first direct-current voltage is still variable by means of varying the resistance value for deciding the reference voltage. A circuit block formed on one substrate is applicable in common to various types of the first direct-current voltage generation means and the electric compressor driving apparatus. Furthermore, a space hitherto occupied in an automobile by the circuit block is dispensed with by mounting the circuit block on a circuit substrate on the terminals for connecting the circuit block.

Consequently, the space occupied by the circuit and the number of parts are reduced and heat generation is suppressed. The electric compressor driving apparatus for the automobile in accordance with the present invention can work for a wide range of output voltage of the motor driving power supply.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Preferred embodiments of the present invention will be described hereinafter with reference to the accompanying drawings.

[First Embodiment]
[First Example of first embodiment]

Figure 7:
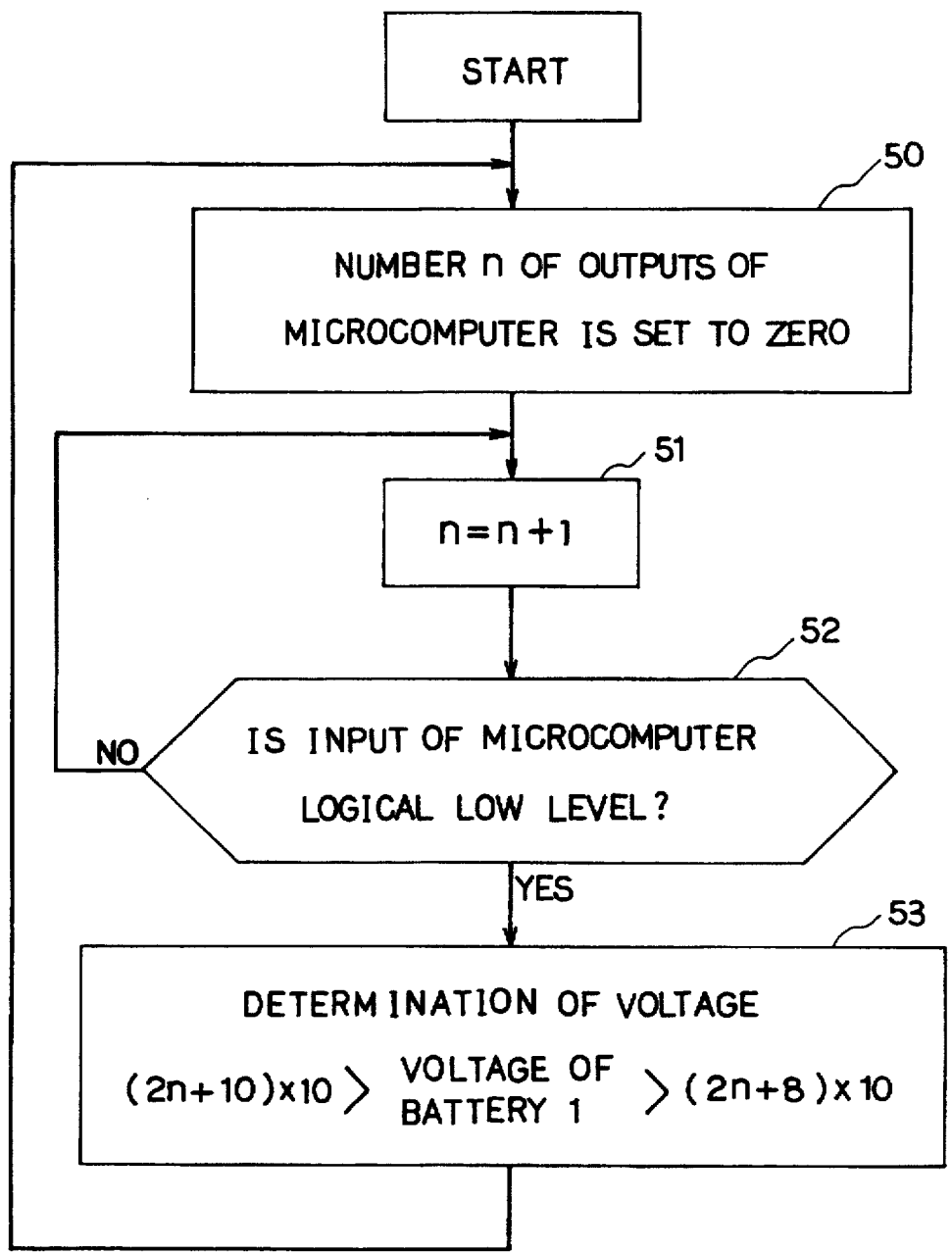
FIG. 7 is a flowchart of operation of a microcomputer in the first example of the first embodiment.

A first example of a first embodiment of the present invention is described with reference to FIG. 1A and FIG. 7.

Figure 1A:
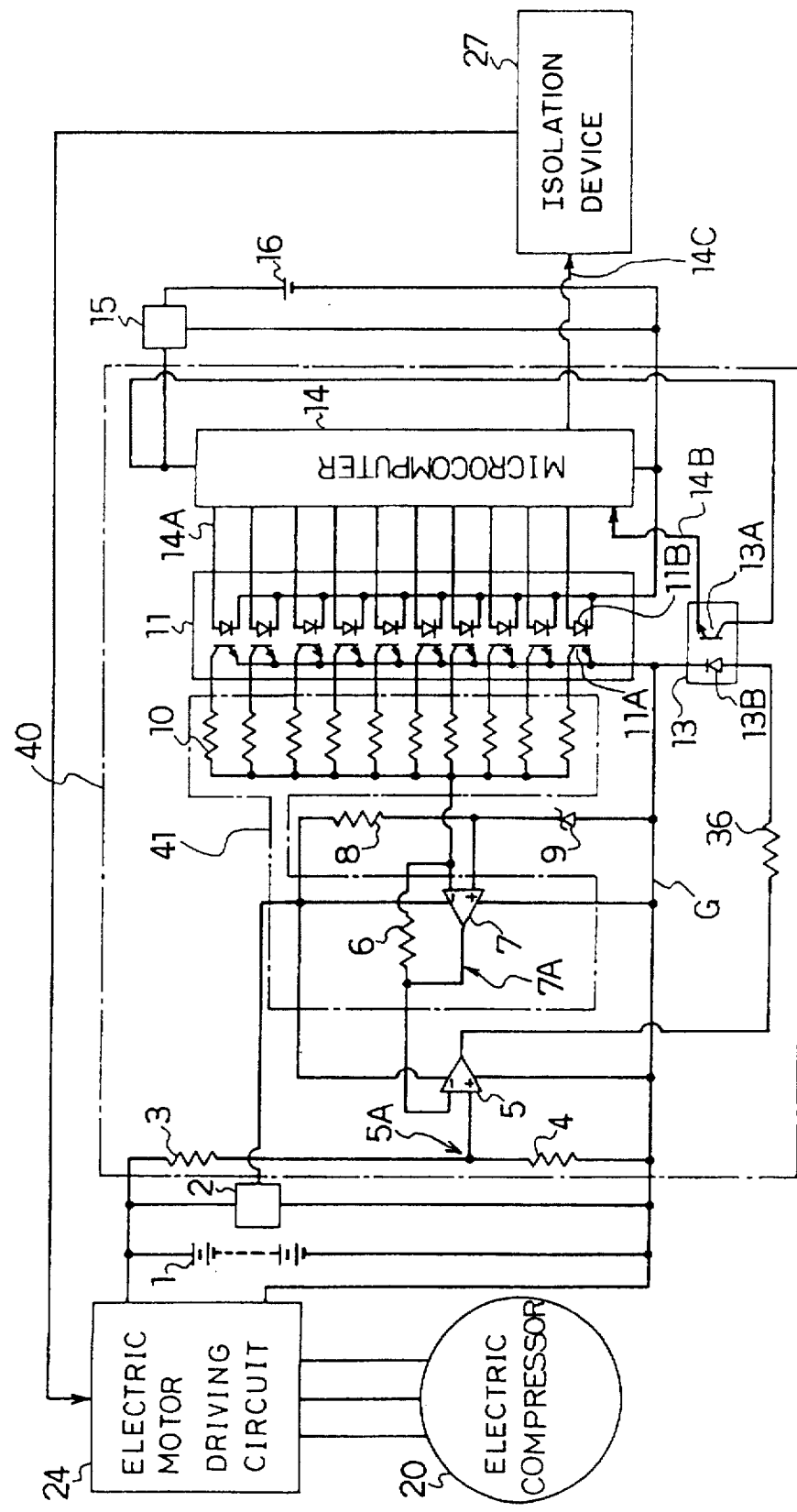
FIG. 1A is a circuit diagram of the electric compressor driving apparatus of a first example of a first embodiment in accordance with the present invention.

FIG. 1A is a circuit diagram of the electric compressor driving apparatus of the first example of the first embodiment in accordance with the present invention. FIG. 7 is a flowchart of operation in the first example of the first embodiment.

Figure 13:
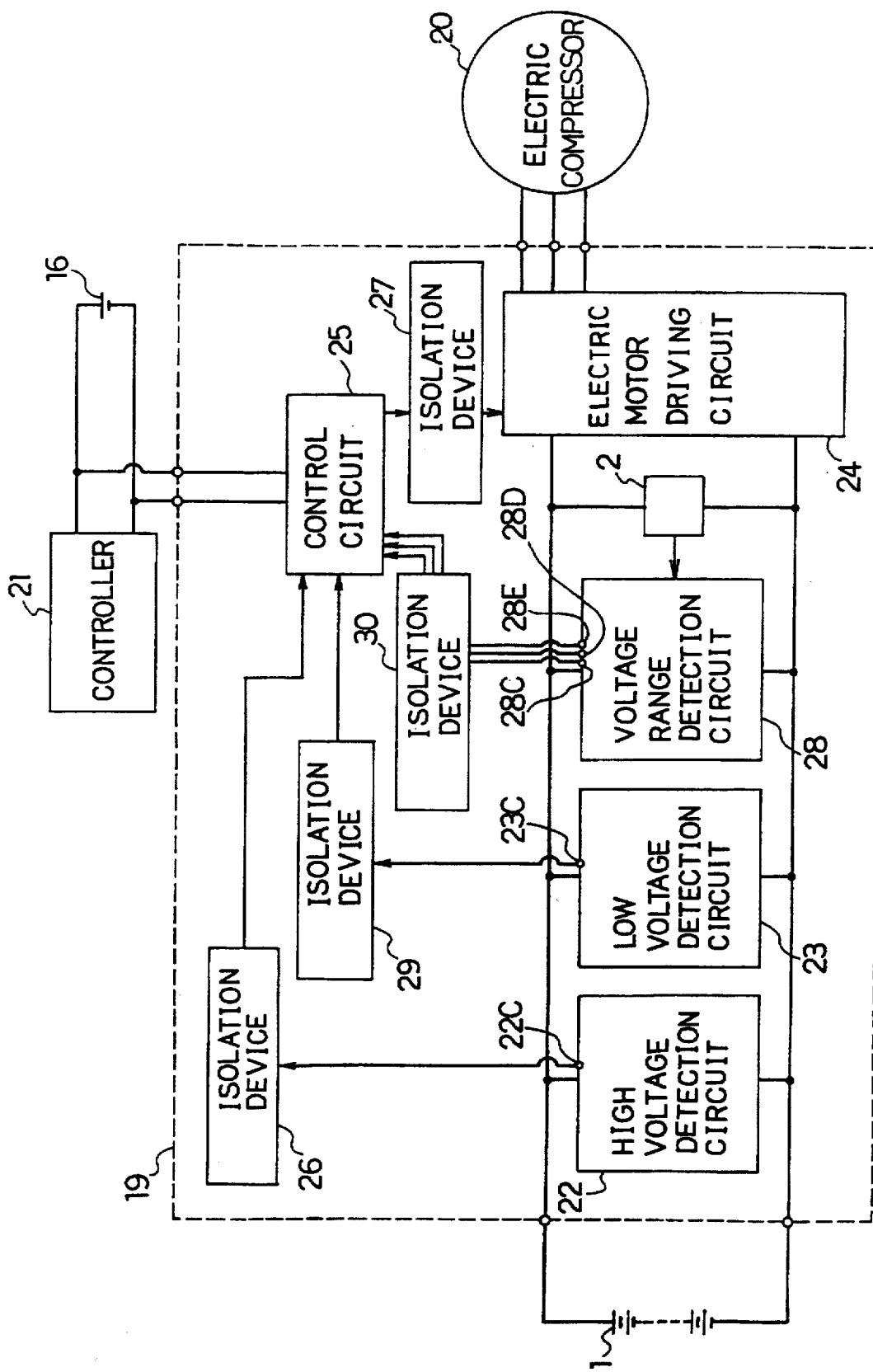
FIG. 13 is the block diagram of the electric compressor driving apparatus in the prior art.
Figure 14:
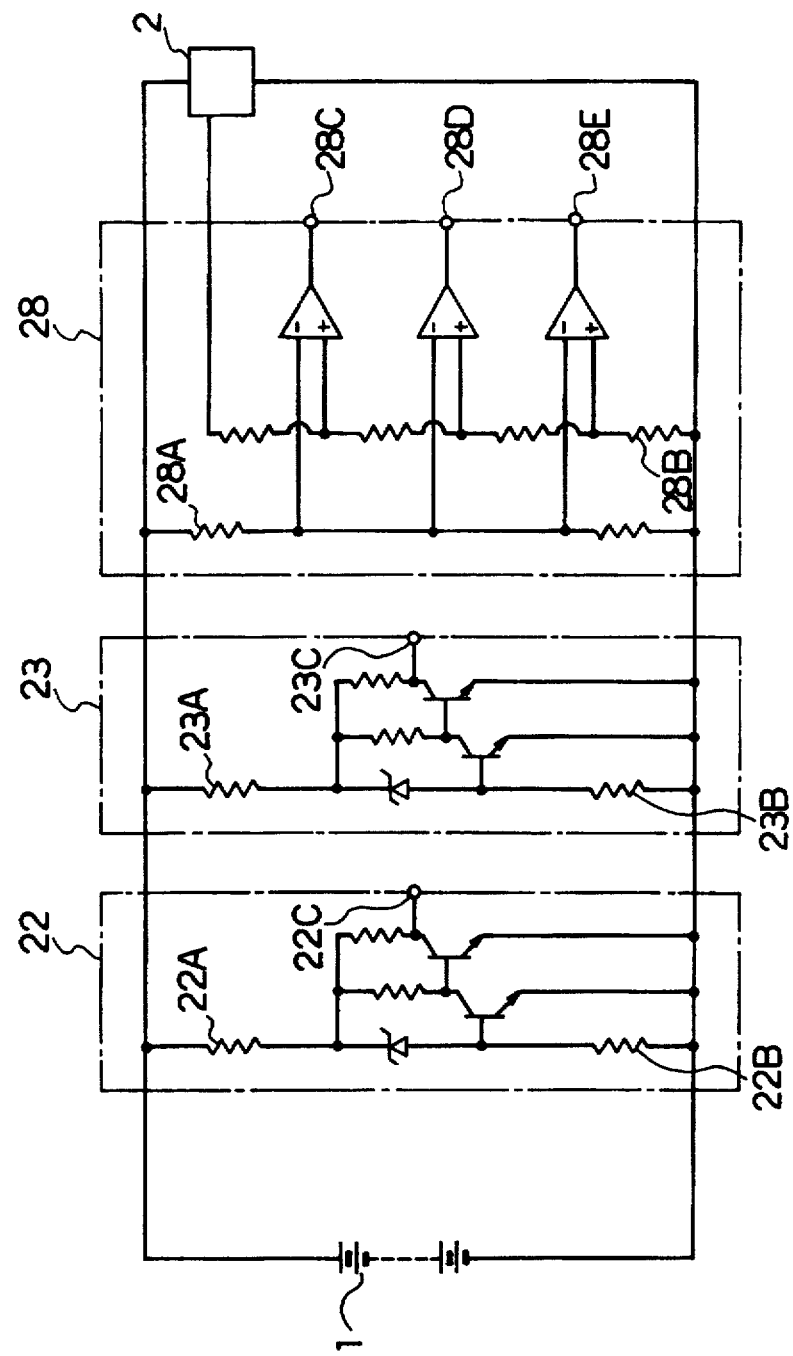
FIG. 14 is the circuit diagram of the voltage detection circuit in the prior art.

Referring to FIG. 1A, an electric compressor 20, an electric motor driving circuit 24, an isolation device 27, series-connected motor-running batteries 1 and a low voltage battery 16 and a switching power supply 2 are parts substantially identical with those in the electric compressor driving apparatus in the prior art as shown and explained in FIG. 13. A microcomputer 14 comprises the function of a control circuit 25 in FIG. 13.

A voltage detection circuit 40 for detecting a voltage of the motor-running batteries 1 comprises resistors 3 and 4 for dividing the voltage of the batteries 1, a resistor 8 and a zoner diode 9 configurating a reference voltage circuit, a comparator 5, an operational amplifier 7 and resistors 6 and 10 which configurate a voltage amplifier 41, photocouplers array 11, a photocoupler 13 and the microcomputer 14 which forms a computer means. Electric power for the comparator 5 and the voltage amplifier 41 is supplied by the switching power supply 2. Electric power for the microcomputer 14 is supplied by a regulated power supply 15 of 5 volts. The low voltage battery 16 of 12 volts for electrical equipments in the automobile supplies electric power to the regulated power supply 15.

Operation of the electric compressor driving apparatus is described hereafter.

The total voltage of the batteries 1 is 290 V (volts). The switching power supply 2 is fed from the batteries 1 and supplies a regulated output of 50 V to the comparator 5, the operational amplifier 7 and the resistor 8. The resistors 3 and 4 have resistance values of 90 kΩ and 10 kΩ, respectively, and divide the voltage of the batteries 1 into 1/10 (one tenth). The divided voltage 5A of 29 V is applied to the noninvert input (+) of the comparator 5. The resistor 8 is of 10 kΩ. A zener voltage of the zener diode 9 is 10 V, and a stabilized reference voltage of 10 V is applied to the noninvert input (+) of the operational amplifier 7. The resistor 6 is of 2 kΩ. All of the resistors 10 are of 10 kΩ.

One terminal of each resistor 10 is connected in common to the invert input (−) of the operational amplifier 7. The other terminals of resistors 10 are connected to respective phototransistors 11A of the photocouplers array 11. Light emitting diodes (hereinafter is referred to as LED) 11B of the photocouplers array 11 are connected to respective output ports 14A of the microcomputer 14.

When no output signal is issued from the output ports 14A of the microcomputer 14 (Step 50 in FIG. 7), any LED 11B of the photocouplers array 11 does not emit light, and all phototransistors 11A remain OFF. Therefore, any resistor 10 is not connected to the ground G, and the operational amplifier 7 outputs a comparison voltage 7A of 10 V. The comparison voltage 7A is applied to the invert input (−) of the comparator 5. The comparator 5 is impressed with the voltage of 29 V at the noninvert input (+) and with the voltage of 10 V at the invert input (−), and the output thereof turns a logical high level (Step 52 in FIG. 7). The output of the comparator 5 is applied to an LED 13A of the photocoupler 13 through a resistor 36, and the LED 13A emits light. The phototransistor 13A of the photocoupler 13 turns ON, and the voltage of 5 V of the regulated power supply 15 is applied to an input port 14B of the microcomputer 14. The microcomputer 14 is given data of the reference voltage of 10 V, the resistance value of 2 kΩ of the resistor 6 and the resistance value of 10 kΩ of the resistors 10 in advance, and it is determined that the divided voltage 5A is higher than 10 V by computation based on these data.

When it is determined that the divided voltage 5A is higher than the reference voltage of 10V by the microcomputer 14, an output signal is issued from one of ten output ports 14A. The number of output port issuing the output signal increases every above-mentioned determination operation (Step 51 in FIG. 7).

When the output signal is issued from one of ten output ports 14A of the microcomputer 14, one LED 11B of the photocouplers array 11 connected to the output port 14A, which is issuing the output signal, emits light; and a phototransistor 14A coupled with the LED 11B turns ON. Then one of ten resistors 10 is connected to the ground G. Consequently, the operational amplifier 7 outputs a voltage obtained by calculation of equation (1) for the comparison voltage 7A.

$$\frac{10 \text{ V} \times (2 \text{ k}\Omega + 10 \text{ k}\Omega)}{10 \text{ k}\Omega} = 12 \text{ V} \qquad (1)$$

The comparison voltage 7A of 12 V is applied to the invert input (−) of the comparator 5. The comparator 5 is impressed with the voltage of 29 V at the noninvert input (+) and with the voltage of 12 V at the invert input (−). In the comparator 5, since the voltage at the noninvert input (+) is higher than the voltage at the invert input (−), the output thereof remains the logical high level (step 52 in FIG. 7). The output of the comparator 5 is applied to the LED 13B of the photocoupler 13 through the resistor 36 and the LED 13B emits light. Consequently, the phototransistor 13A turns ON and the voltage of 5 V is applied to the microcomputer 14. Since the microcomputer 14 is given data of the reference voltage of 10 V, the resistance value of 2 kΩ of the resistor 6 and the resistance value of 10 kΩ of the resistor 10 in advance, by computing of these date, it is determined that the divided voltage 5A is higher than 12 V. Consequently, the output signals of the microcomputer 14 are issued to two output ports 14A (step 51 in FIG. 7).

When the output signals are issued from two of ten output ports 14A of the microcomputer 14, two LEDs 11B of the photocouplers array 11 connected to the output ports 14A, which is issuing the output signals, emit light; and phototransistors 14A coupled with the LEDs 11B turn ON. Then two of ten resistors 10 are connected to the ground G. Consequently, the operational amplifier 7 outputs a voltage obtained by calculation of equation (2) for the comparison voltage 7A.

$$\frac{10 \text{ V} \times (2 \text{ k}\Omega + 5 \text{ k}\Omega)}{5 \text{ k}\Omega} = 14 \text{ V} \qquad (2)$$

The comparison voltage 7A of 14 V is applied to the invert input (−) of the comparator 5. The comparator 5 is impressed with the voltage of 29 V at the noninvert input (+) and with the voltage of 14 V at the invert input (−). In the comparator 5, since the voltage at the noninvert input (+) is higher than the voltage at the invert input (−), the output thereof remains the logical high level.

The output of the comparator 5 is applied to the LED 13B of the photocoupler 13 through the resistor 36, and the LED 13B emits light. Consequently, the phototransistor 13A turns ON and the voltage of 5 V is applied to the microcomputer 14. In the microcomputer 14, it is determined that the divided voltage 5A is higher than 14 V.

In a similar manner as mentioned above, the comparison voltage 7A rises by two volts for every increase of number of the resistors 10 which are connected to the ground G. When the output signals are issued from nine output ports 14A of the microcomputer 14, nine resistors 10 are connected to the ground G, and the comparison voltage 7A output from the operational amplifier 7 is about 28 V. The output of the comparator 5 remains the logical high level, and the LED 13B of the photocoupler 13 emits light. Furthermore, when the output signals are issued from ten output ports 14A of the microcomputer 14, ten resistors 10 are connected to the ground G, and the comparison voltage 7A output from the operational amplifier is 30 V. The comparison voltage 7A of 30 V is applied to the invert input (−) of the comparator 5. Since the comparator 5 is impressed with the voltage of 29 V at the noninvert input (+) and with the voltage of 30 V at the invert input (−), the output of the comparator 5 turns a logical low level. Therefore, the LED 13B of the photocoupler 13 does not emit light and the phototransistor 13A turns OFF, and the voltage of 5 V is not applied to the microcomputer 14. Consequently, in the microcomputer 14, it is determined that the divided voltage 5A is higher than 28 V and lower than 30 V. Since the data of dividing ratio of 1/10 has been inputted in the microcomputer 14 in advance, it is determined that the voltage of the batteries 1 is higher than 280 V and lower than 300 V through dividing the voltages by the dividing ratio of 1/10 (Step 53 in FIG. 7).

If the operation program of the microcomputer 14 is predetermined so as to employ the central value between two voltages, the voltage of 290 V is detected with the accuracy of ±10 V.

Since the comparison voltage 7A is changed stepwise with each step of 2 V, which is a relatively large voltage, the voltage detection circuit 40 can be operated without suffering even in an electric compressor driving apparatus which generally has considerable electric noise.

[Second example of first embodiment]

Figure 1B:
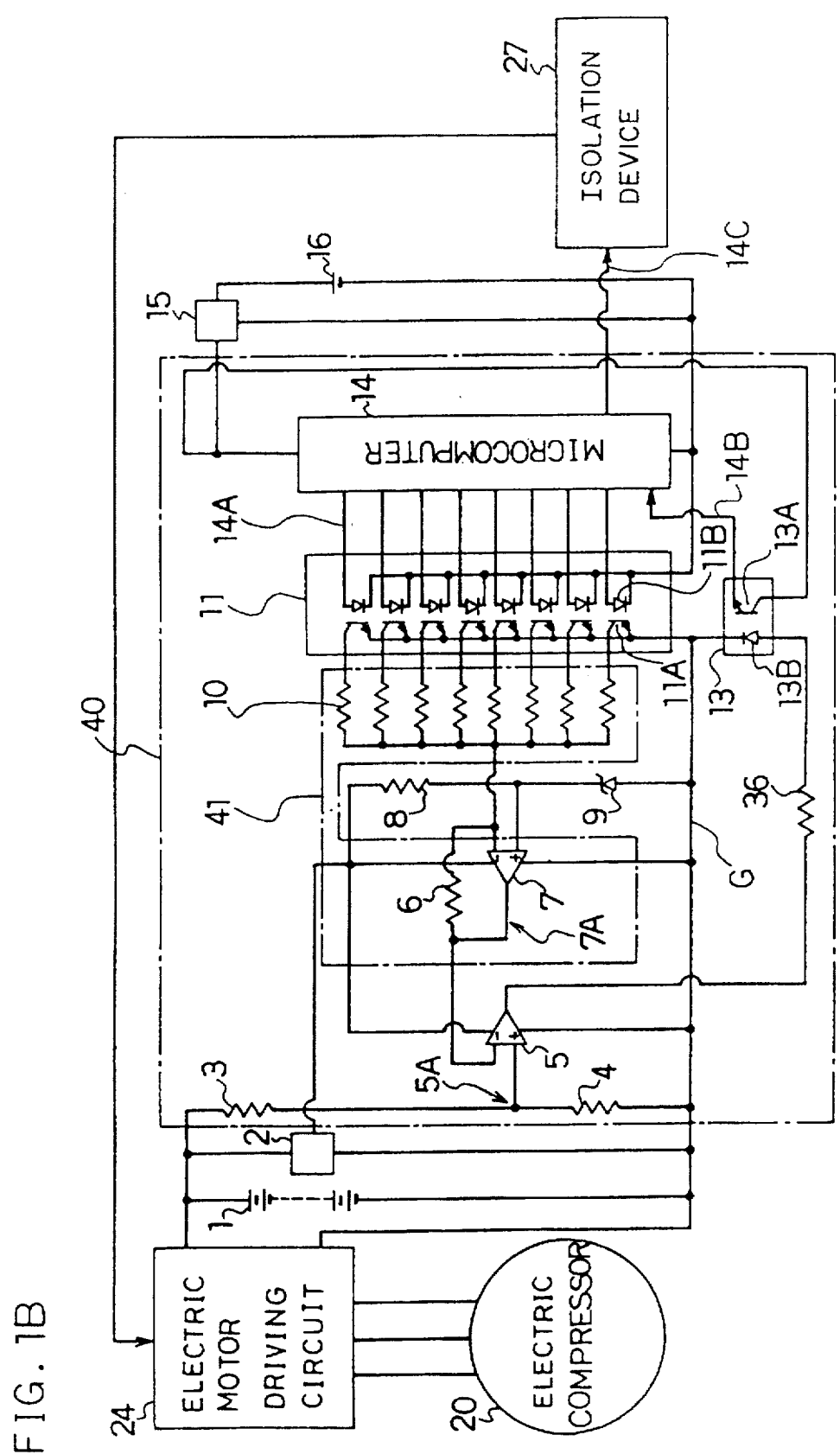
FIG. 1B is a circuit diagram of the electric compressor driving apparatus of a second example of the first embodiment in accordance with the present invention.
Figure 8:
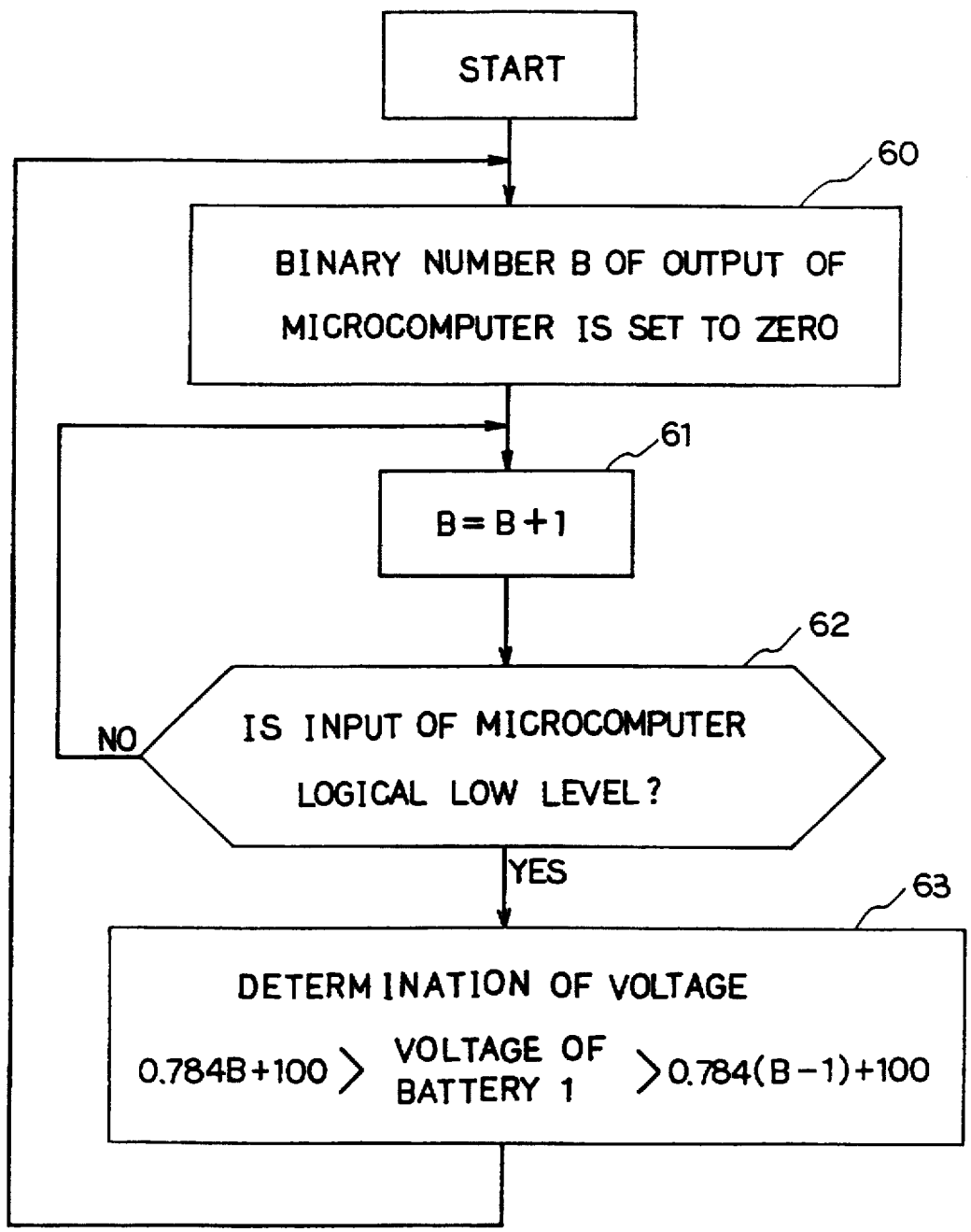
FIG. 8 is a flowchart of operation of the microcomputer in the second example of the first embodiment.

A second example of the voltage detection circuit 40 may be employed besides the circuit of FIG. 1A. The second example is described with reference to FIG. 1B and FIG. 8. In the second example, a set of resistors comprises eight resistors 10 of resistance values 2, 4, 8, 16, 32, 64, 128 and 256 (kΩ), respectively. The set consists of eight resistors having resistance values making a sequence of n-th power of 2 ($2_n$, n: natural number, 1, 2, 3, 4, 5, 6, 7 and 8). These eight resistors 10 of 2, 4, 8, 16, 32, 64, 128 and 256 (kΩ, respectively) correspond to respective digits of the binary member of eight bits. The least digit of the binary corresponds to the resistor of 256 kΩ, and the largest digit corresponds to the resistor of 2 kΩ. The eight resistors 10 correspond to eight output ports 14A of the microcomputer 14 through respective pairs of the LEDs 11B and phototransistors 11A of the photocouplers array 11.

When no output signal is issued from the output ports 14A of the microcomputer 14 (Step 60 in FIG. 8), in a similar manner as mentioned above, it is determined that the divided voltage 5A is higher than 10 V by the microcomputer 14.

When output signals corresponding to 1 of a binary number B are output to the output ports 14A (Step 61 in FIG. 8), the LED 11B of the photocouplers array 11 corresponding to 1 of the binary number B emits light. So that the resistor 10 of 256 kΩ is connected to the ground G. Consequently, the operational amplifier 7 outputs a voltage obtained by calculation of equation (3) for the comparison voltage 7A.

$$\frac{10 \text{ V} \times (2 \text{ k}\Omega + 256 \text{ k}\Omega)}{256 \text{ k}\Omega} = 10.078 \text{ V} \quad (3)$$

The comparison voltage 7A of 10.078 V is applied to the invert input (−) of the comparator 5. The comparator 5 is impressed with the voltage of 29 V at the noninvert input (+) and with the voltage of 10.078 V at the invert input (−). In the comparator 5, since the voltage at the noninvert input (+) is higher than the voltage at the invert input (−), the output of the comparator 5 remains the logical high level. The output of the comparator 5 is applied to the LED 13B of the photocoupler 13 through the resistor 36, and the LED 13B emits light. The phototransistor 13A turns ON and the voltage of 5 V is applied to the microcomputer 14. Since the microcomputer 14 is given data of the reference voltage of 10 V, resistance value of the resistor 6 and the resistance values of eight resistors 10 in advance, through computation of these data, it is determined that the divided voltage 5A is higher than 10.078 V.

When an output signal corresponding to 2 of binary number B is issued from the output ports 14A, the LED 11B of the photocouplers array 11 corresponding to 2 of binary number B emits light, and the resistor 10 of 128 k is connected to the ground G. Consequently, the operational amplifier 7 outputs a voltage obtained by calculation of equation (4) for the comparison voltage 7A.

$$\frac{10 \text{ V} \times (2 \text{ k}\Omega + 128 \text{ k}\Omega)}{128 \text{ k}\Omega} = 10.156 \text{ V} \quad (4)$$

The comparison voltage 7A of 10.156 V is applied to the invert input (−) of the comparator 5. The comparator 5 is impressed with the voltage of 29 V at the noninvert input (+) and with the voltage of 10.156 V at the invert input (−). In the comparator 5, since the voltage at the noninvert input (+) is higher than the voltage at the invert input (−), the output of the comparator 5 remains the logical high level. The output of the comparator 5 is applied to the LED 13B of the photocoupler 13 through the resistor 36, and the LED 13B emits light. The phototransistor 13A turns ON and the voltage of 5 V is applied to the microcomputer 14. In the microcomputer 14, it is determined that the divided voltage 5A is higher than 10.156 V.

When an output signal corresponding to 3 of binary number B is issued from the output ports 14A, the LEDs 11B of the photocouplers array 11 corresponding to 3 of binary number B emit light, and the resistors 10 of 256 kΩ and 128 kΩ are connected in parallel to the ground G. Consequently, the operational amplifier 7 outputs a voltage obtained by calculation of equation (5) for the comparison voltage 7A.

$$\frac{10 \text{ V} \times (2 \text{ k}\Omega + 85.33 \text{ k}\Omega)}{85.33 \text{ k}\Omega} = 10.234 \text{ V} \quad (5)$$

The comparison voltage 7A of 10.234 V is applied to the comparator 5. The comparator 5 is impressed with the voltage of 29 V at the noninvert input (+) and with the voltage of 10.234 V at the invert input (−). In the comparator 5, since the voltage at the noninvert input (+) is higher than the voltage at the invert input (−), the output of the comparator 5 remains the logical high level.

The output of the comparator 5 is applied to the LED 13B of the photocoupler 13 through the resistor 36, and the LED 13B emits light. Thereby, the phototransistor 13A turns ON and the voltage of 5 V is applied to the microcomputer 14. In the microcomputer 14, it is determined that the divided voltage 5A is higher than 10.234 V.

In a similar manner, the comparison voltage 7A gradually rises. When an output signal corresponding to 255 of binary number B (maximum value of 8 digits binary) is issued from the output ports 14A, all the LEDs 11B of the photocouplers array 11 emit light and all the phototransistors 11A turn ON, and eight resistors 10 are connected to the ground G. Consequently, the operational amplifier 7 outputs a voltage obtained by calculation of equation (6) for the comparison voltage 7A.

$$\frac{10 \text{ V} \times (2 \text{ k}\Omega + 1 \text{ k}\Omega)}{1 \text{ k}\Omega} = 30 \text{ V} \quad (6)$$

Since the member of steps in change of the comparison voltage 7A is 255 steps from 1 to 255, in variation of the comparison voltage 7A in the above-mentioned operation, the comparison voltage 7A rises stepwise by 0.0784 V (=(30V−10 V)/255), on the average.

The voltage detection in the second example of the first embodiment is carried out as described hereafter. When the output signals corresponding to 242 of binary number (11110010) are output from the microcomputer 14, the LEDs 11B of the photocouplers array 11, which correspond to 242 of binary number B, emit light: and the phototransistors 11A corresponding to 242 of binary number B turn ON. Consequently, the resistors 10 corresponding to 242 of binary number B are connected to the ground G. The operational amplifier 7 outputs a voltage obtained by calculation of equation 7 for the comparison voltage 7A.

$$10V + 0.0784V \times 242 = 28.973V \quad (7)$$

The comparison voltage 7A of 28.973 V is applied to the invert input (−) of the comparator 5. The comparator 5 is impressed with the voltage of 29 V at the noninvert input (+) and with the voltage of 28.973 V at the invert input (−), and the output thereof remains the logical high level. The output of the comparator 5 is applied to the LED 13B of the photocoupler 13 through the resistor 36, and the LED 13B emit light. The phototransistor 13A turns on, and the voltage of 5 V is applied to the microcomputer 14. In the microcomputer 14, it is determined that the divided voltage 5A is higher than 28.793 V.

Subsequently, when the output signals corresponding to 243 of binary number (11110011) are output from the microcomputer 14, the LEDs 11B of the photocouplers array 11 which correspond to 243 of the binary number B emit light, and thereby the phototransistors 11A corresponding to 243 of binary number B turn ON. Consequently, the resistors 10 corresponding to 243 of binary number B are connected to the ground G. The operational amplifier 7 outputs a voltage obtained by calculation of equation 8 for the comparison voltage 7A.

$$10V + 0.0784V \times 243 = 29.051 \quad (8)$$

The comparison voltage of 29.051 V is applied to the invert input (−) of the comparator 5. The comparator 5 is impressed with the voltage of 29 V at the noninvert input (+) and with the voltage of 29.051 V at the invert input (−), and the output thereof turns the logical low level. Therefore, the LED 13B of the photocoupler 13 does not emit light, and the phototransistor 13A turns OFF and the voltage of 5 V is not applied to the microcomputer 14. Consequently, in the microcomputer 14, it is determined that the divided voltage 5A is lower than 29.051 V (Step 63 in FIG. 8).

By the above-mentioned process, in the microcomputer 14, it is determined that the divided voltage 5A is higher than 28.973 V and lower than 29.051 V; and it is determined that the voltage of the batteries 1 is higher than 289.73 V and lower than 290.51 V by calculation on the basis of the dividing ratio 1/10 inputted as the data.

In the case that calculation program in the microcomputer 14 is made adaptable to calculate an average value (central value) of the above mentioned voltages 289.73 V and 290.51 V, the detected voltage is 290.12 V. Therefor, the voltage of the batteries 1 can be detected with a high accuracy of ±0.392 V (±0.0784V×10/2).

In the case that electric noise is liable to influence, it is preferable that the number of the resistors 10 is reduced to six resistors 10 corresponding to 2, 4, 8, 16, 32 and 64 of binary numbers, for example. Consequently, the unit of change of the comparison voltage 7A is increased and anti-noise property is improved. On the contrary, in the case that the electric noise does not influence, accuracy of detection of the voltage of the batteries 1 can be improved by suitably increasing the number of the resistors 10 to nine resistors corresponding to 2, 4, 8, 16, 32, 64, 128, 256 and 512 of binary numbers, for example and reducing small the unit of change of the comparison voltage 7A.

In the electric compressor driving apparatus of the first embodiment in FIG. 1, in the event that the output voltage of the batteries 1 lowers and the output of the switching power supply 2 for the comparator 5 and the operational amplifier 7 is suspended, the output of the comparator 5 is also suspended, and the voltage of 5 V is not applied to the microcomputer 14. Therefore, in the microcomputer 14, it is determined that the divided voltage 5A is lower than the voltage of 10 V. The determination serves as a fail-safe scheme, and any erroneous operation is prevented.

[Second embodiment]

Figure 2:
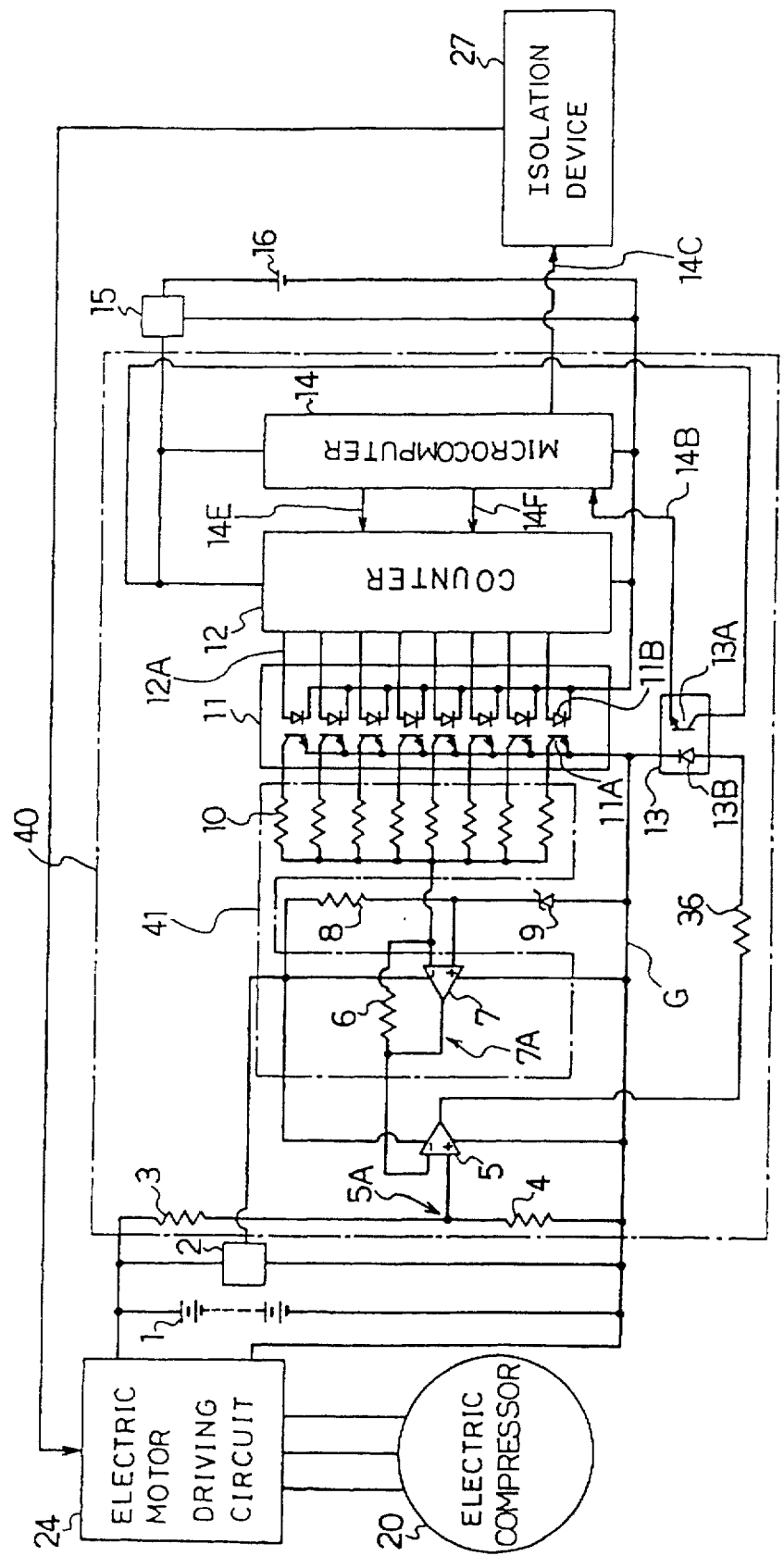
FIG. 2 is a circuit diagram of the electric compressor driving apparatus of a second embodiment in accordance with the present invention.
Figure 9:
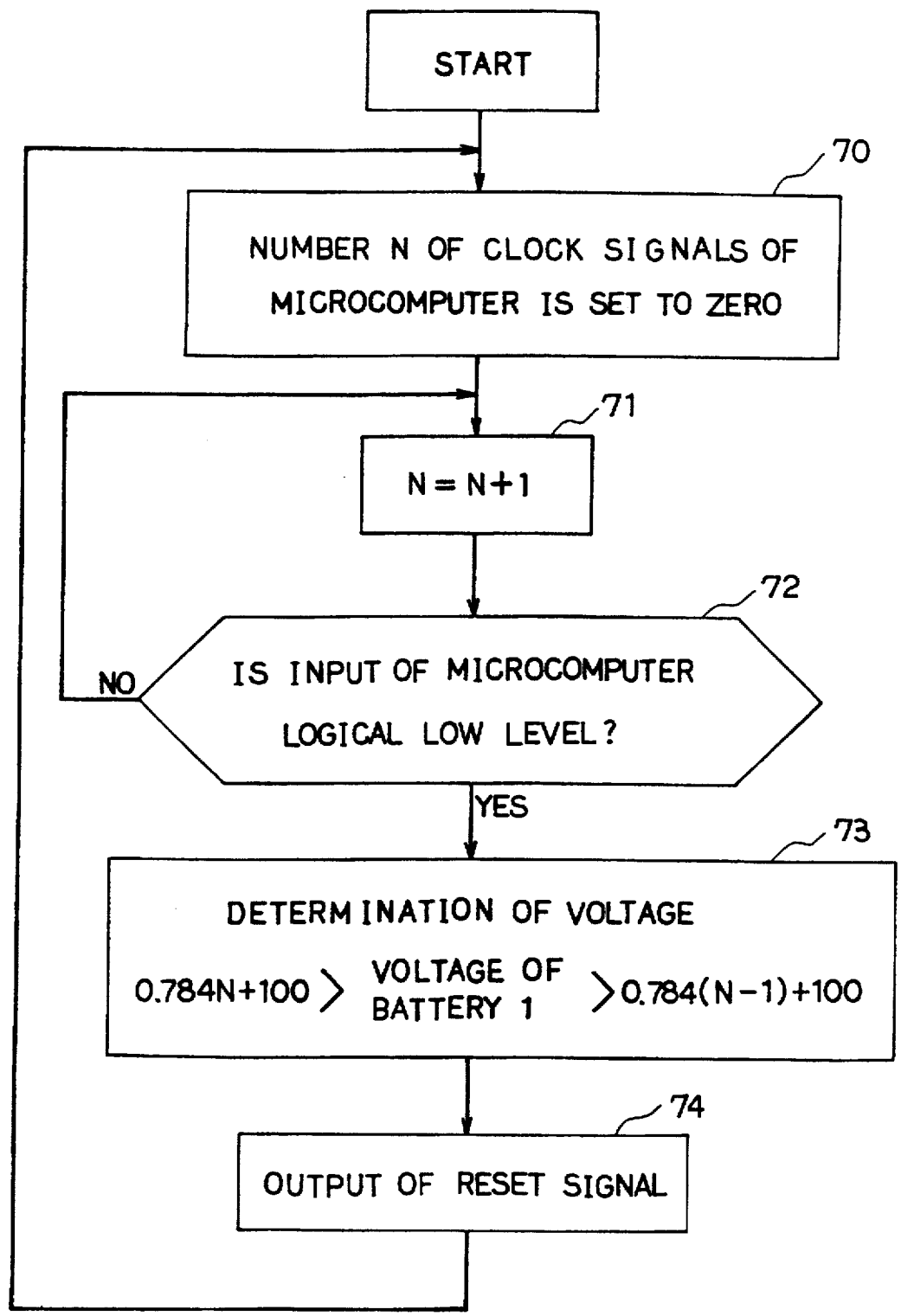
FIG. 9 is a flowchart of operation of the microcomputer in the second embodiment.

A second embodiment of the present invention is described with reference to FIG. 2, FIG. 9, FIG. 10A and FIG. 10B. FIG. 2 is a circuit diagram of the electric compressor driving apparatus of the second embodiment in accordance with the present invention. FIG. 9 is a flowchart of operation in the second embodiment. In the electric compressor driving apparatus of the second embodiment, a counter 12 is disposed between the photocouplers array 11 and the microcomputer 14. Other elements in the second embodiment are similar to those of the second example of the first embodiment, and the values of the circuit components are identical with those of the second example.

The counter 12 counts the number N of clock signal inputted thereto from the microcomputer 14 through an output port 14E. A binary number of 8 digits is output to eight output terminals 12A. In initial state, the counter 12 outputs the signal corresponding to zero of binary number (Step 70 in FIG. 9).

When the clock signal is inputted to the counter 12 from the microcomputer 14 through an output port 14E (step 71 in FIG. 9), the LEDs 11B of the photocouplers array 11, which correspond to the binary number representing the number N of the inputted clock signal, emit light. Consequently, the phototransistors 11A corresponding to the LEDs 11B which are emitting light turn ON. Successive operations are similar to those of the second example of the first embodiment, and the voltage of 5 V is applied to the microcomputer 14 by turning ON of the phototransistor 13A (Step 72 in FIG. 9). And the voltage of the batteries 1 is determined in a manner similar to the second example of the first embodiment (Step 73 in FIG. 9).

In the second embodiment, since the binary number is produced by the counter 12 instead of the microcomputer 14, burden to the microcomputer 14 is reduced. The number of output ports of the microcomputer 14 is also reduced.

The counter 12 is reset by input of a reset signal from the microcomputer 14 to the counter 12 through an output port 14F (Step 74 in FIG. 9) and the counter 12 restarts counting operation. Therefore, the measurement can be repeated by limiting a measuring range.

When the voltage of the batteries 1 becomes abnormally high, it is required to detect the voltage quickly in order to protect a load. On the other hand, slow detecting operation is permitted in detecting a fall of the voltage and detecting a voltage range. Therefore, in the electric compressor driving apparatus of the first and second embodiments, it is preferable to set program in the microcomputer 14 so that the determination whether the voltage of the batteries 1 is 300 V or more is carried out at the time intervals of 100 μS, and mere measurement of voltage is carried out at the time interval of 10 mS.

Figure 10A:
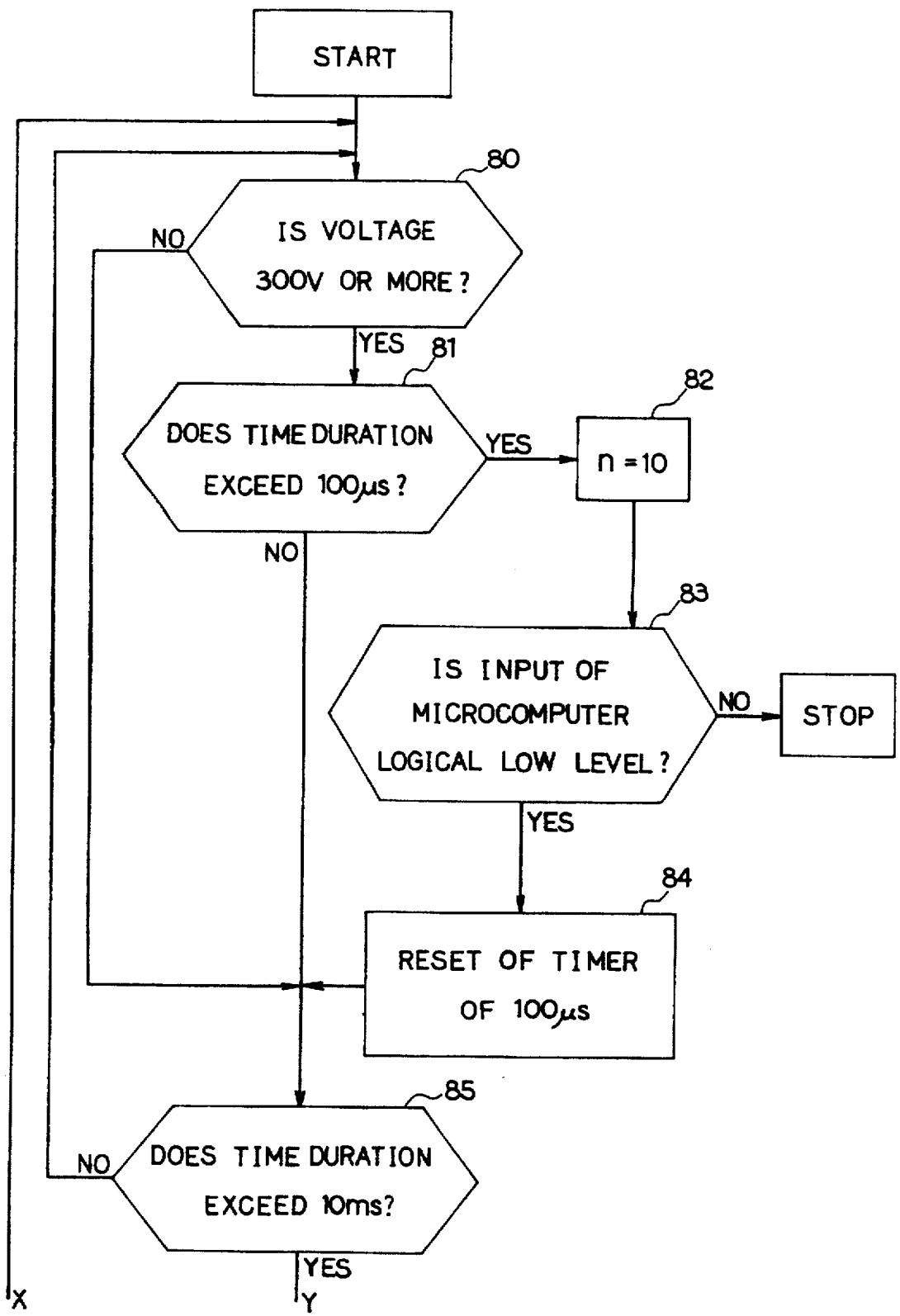
FIG. 10A and FIG. 10B in combination show a flowchart of operation of the microcomputer in an abnormal state of the voltage of the batteries 1.
Figure 10B:
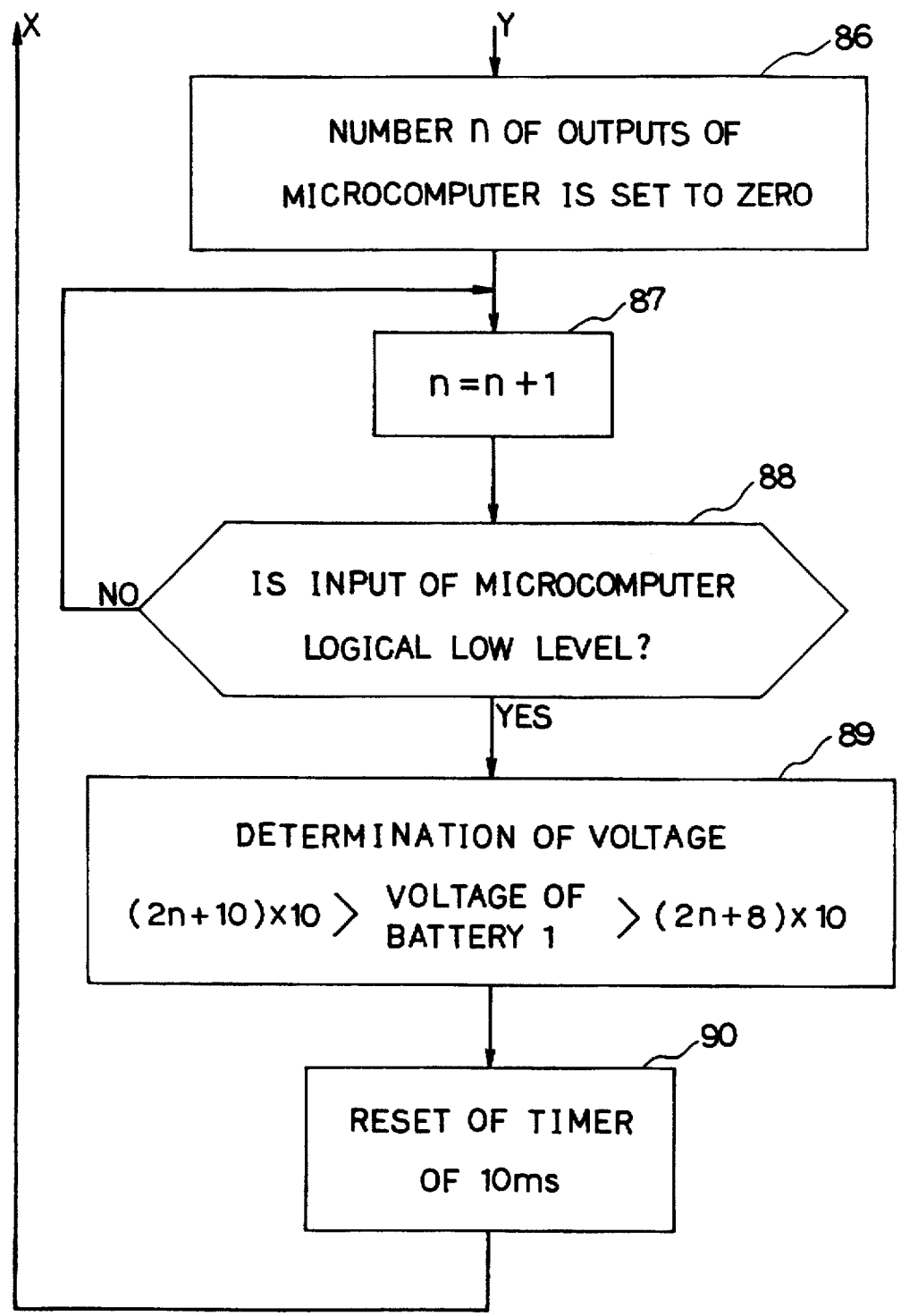

Operation of the electric compressor driving apparatus in an abnormal voltage of the batteries 1 is represented by Steps 80–90 of a flowchart in FIG. 10A and FIG. 10B.

A control signal of the microcomputer 14 is outputs to an output port 14C as shown in FIG. 2, and applied to an electric motor driving circuit 24 through an insulation circuit 27.

[Third embodiment]

A third embodiment of the present invention is described with reference to FIG. 3, FIG. 11, FIG. 12 and FIG. 15A.

Figure 3:
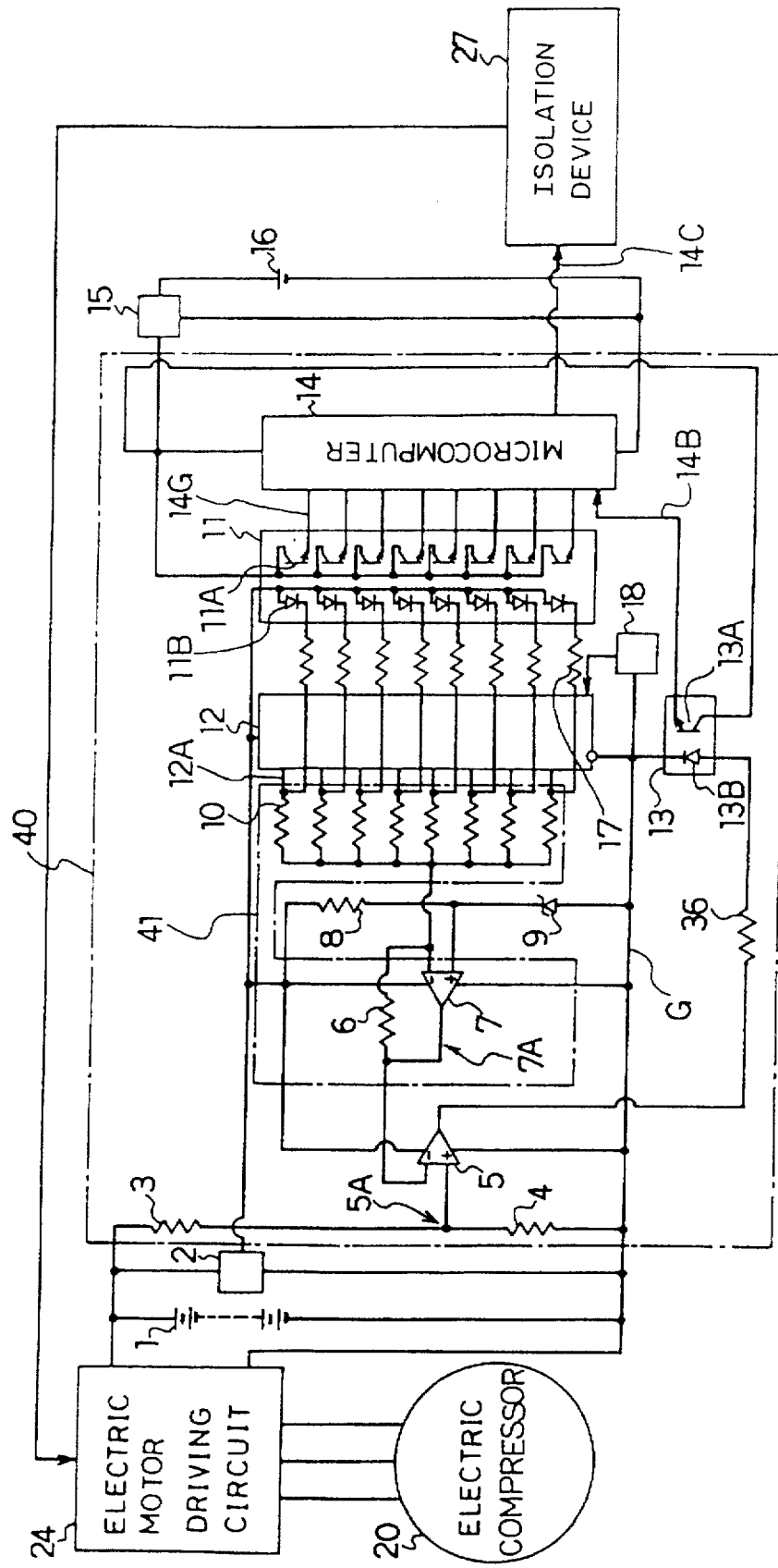
FIG. 3 is a circuit diagram of the electric compressor driving apparatus of a third embodiment in accordance with the present invention.
Figure 11:
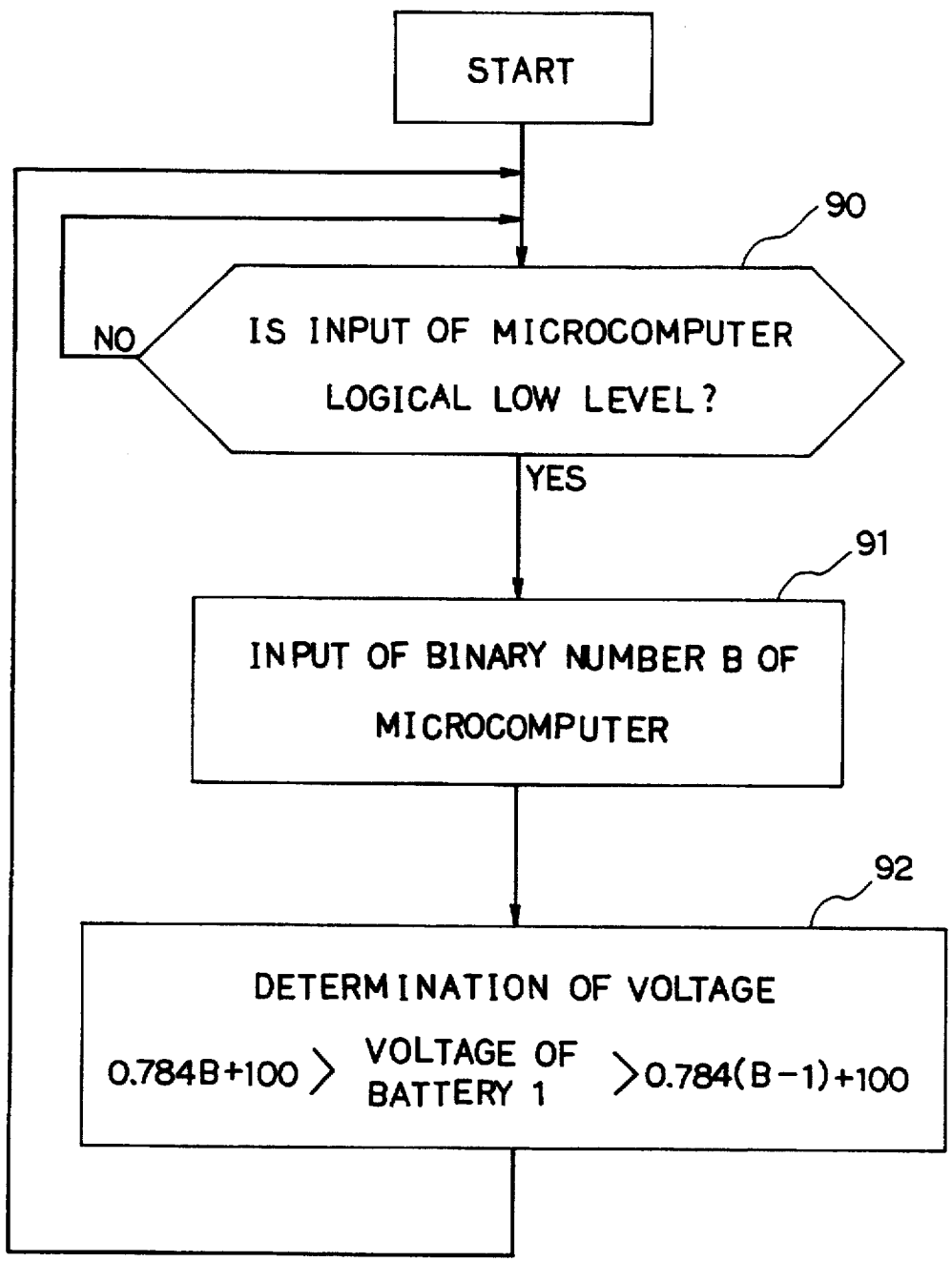
FIG. 11 is a flowchart of operation of the microcomputer in the third embodiment.

FIG. 3 is a circuit diagram of the electric compressor driving apparatus of the third embodiment in accordance with the present invention. FIG. 11 is a flowchart of operation in the third embodiment. In the electric compressor driving apparatus of the third embodiment, the output terminals 12A of the counter 12 are connected to the respective resistors 10, and also through respective resistors 17 to the LEDs 11B of the photocouplers array 11. A clock signal is applied to the counter 12 from a clock generator 18. The phototransistors 11A of the photocouplers array 11 are connected to respective input ports 14G of the microcomputer 14. Other elements in the third embodiment is similar to those of the second example of the first embodiment, and the values of the circuit components are identical with those of the second example of the first embodiment.

The clock signal is inputted to the counter 12 from the clock generator 18, and the resistors 10 corresponding to a binary number B representing the number of inputted clock signal are connected to the ground G. The signals representing the binary number B are also applied to the microcomputer 14 through the photocouplers array 11. In the microcomputer 14, the divided voltage 5A is detected on the basis of the binary number B at a point of time at which the voltage of 5V is applied to the microcomputer 14 by turning ON of the phototransistor 13A.

If the binary number B inputted from the photocouplers array 11 is converted to an analog value and the analog value is inputted to an analog input port of the microcomputer 14, the number of input port 14G of the microcomputer 14 is reduced. The operation in the third embodiment is represented by Steps 90-92 of the flowchart in FIG. 11.

Figure 12:
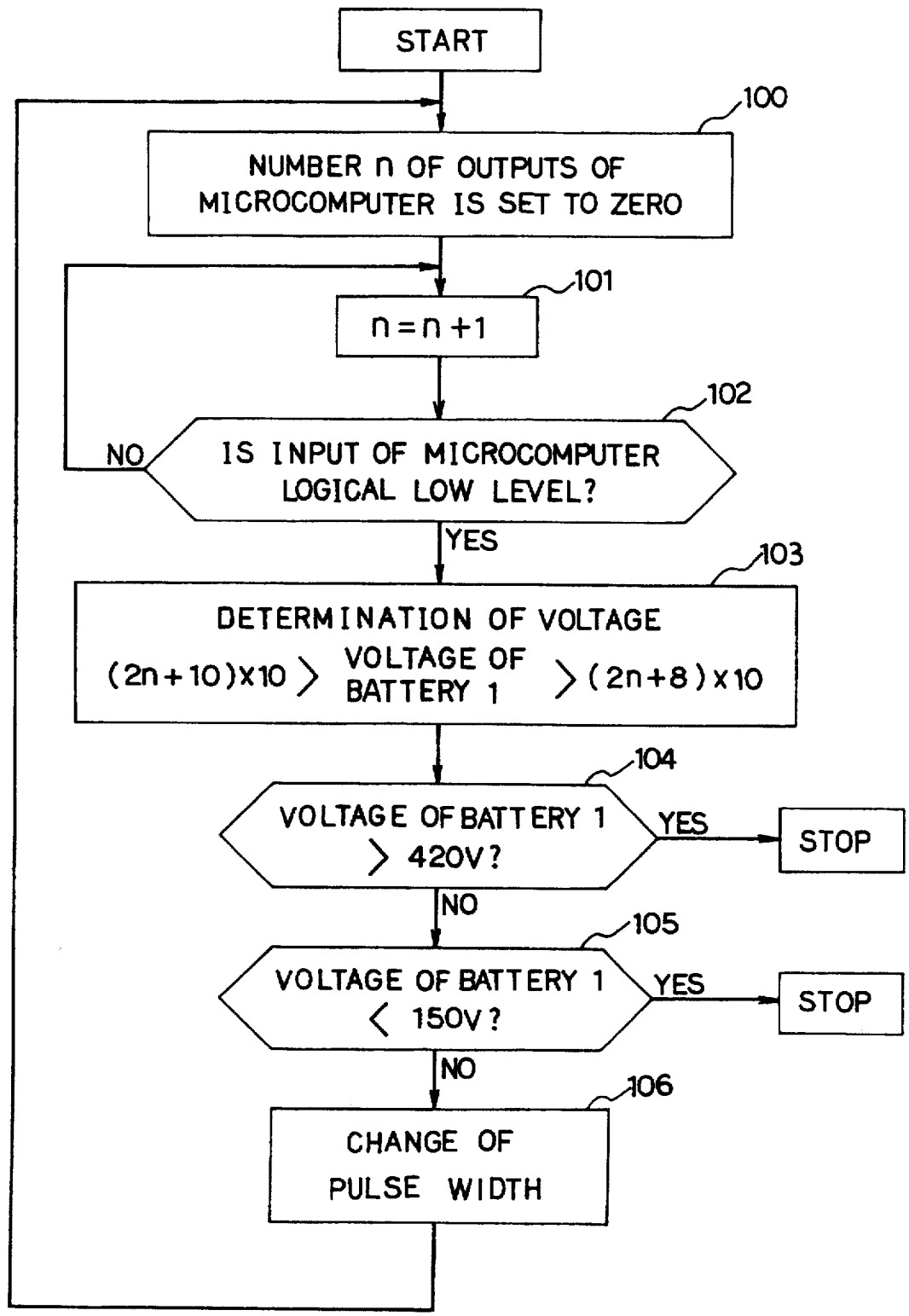
FIG. 12 is a flowchart of operation of low voltage detection, high voltage detection and limitation of an operating voltage range of the microcomputer.

FIG. 12 is a flowchart of operations of high voltage detection, low voltage detection and limitation of an operating voltage range, and these operations are carried out by the microcomputer 14. Referring to FIG. 12, the voltage of the batteries 1 is detected by Steps 100---103 as mentioned in the aforementioned embodiments.

Figure 15A:
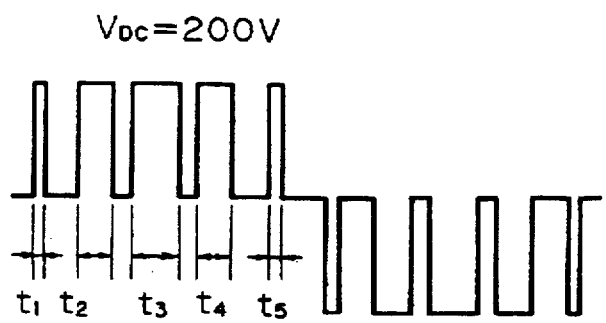
FIG. 15A, FIG. 15B and FIG. 15C are the waveforms of the motor driving voltages in the prior art.
Figure 15B:
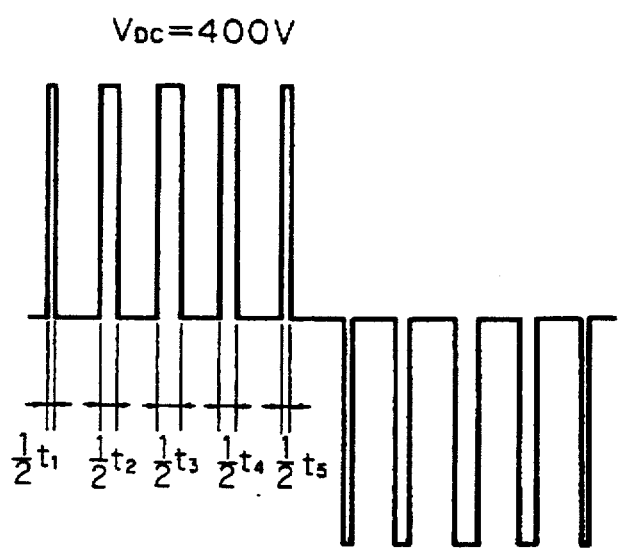
Figure 15C:
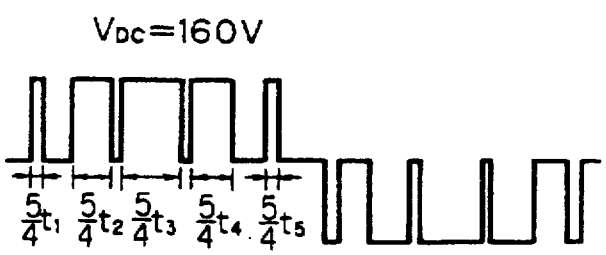

At decision Step 104, when the voltage of the batteries 1 is higher than 420 V, the operation of the electric compressor driving apparatus is suspended. Moreover, at decision Step 105, when the voltage of the batteries 1 is lower than 150 V, the operation of the electric compressor driving apparatus is also suspended. When the voltage of the batteries 1 is 420 V and below and 150 V or more, a pulse width in the waveform of the motor driving voltage as shown in FIG. 15A is changed on the basis of calculation of equation (9) at Step 106.

$$T_a = \frac{200 \times t_a}{\text{voltage of batteries 1}} \quad (9)$$

Where, $t_a$: pulse width at the voltage of 200 V of the batteries 1
$T_a$: pulse width within the voltage range of 150 V–420 V of the batteries 1 (a: natural numbers)

[Fourth embodiment]

A fourth embodiment is described with reference to FIG. 4.

Figure 4:
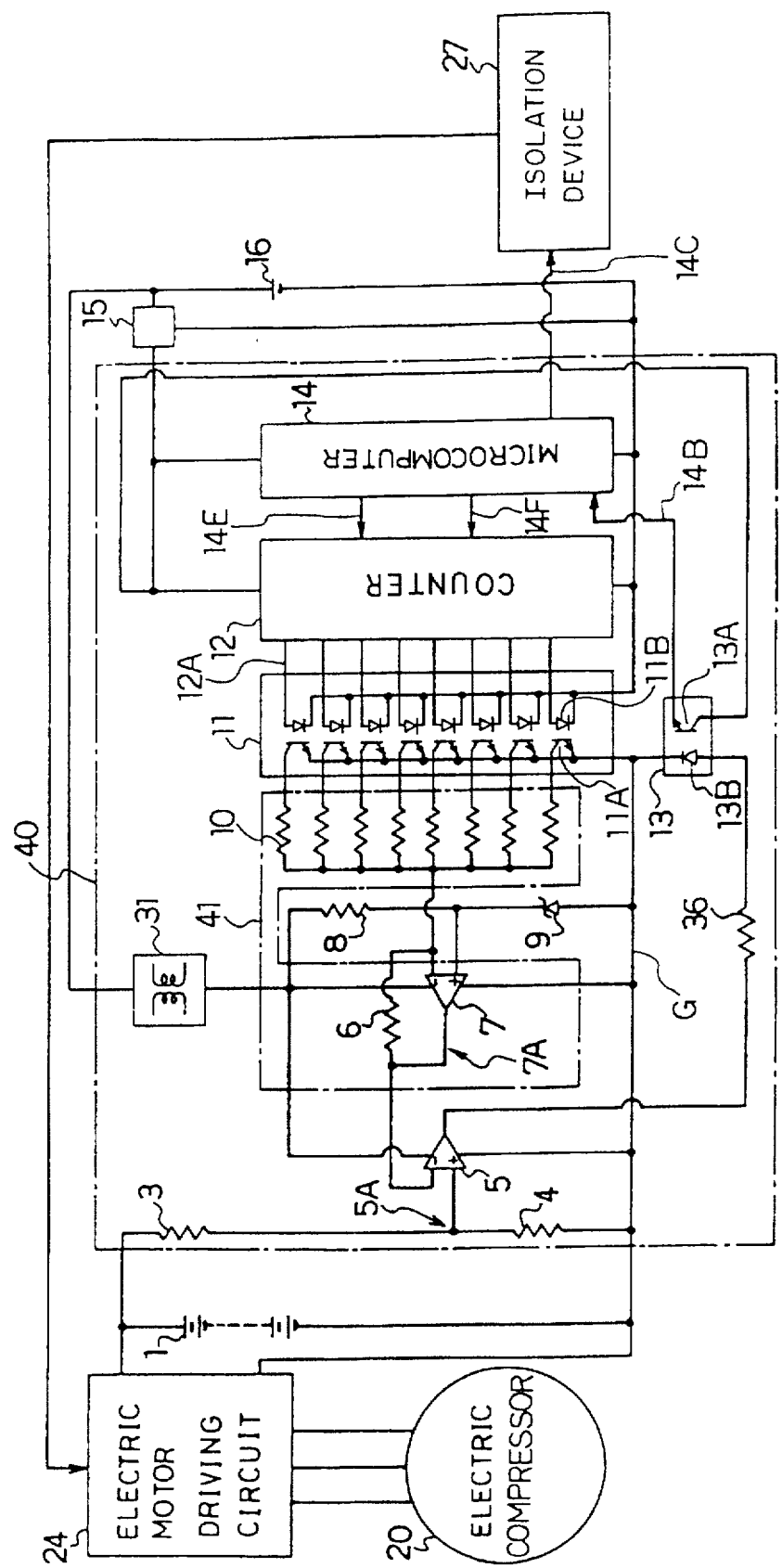
FIG. 4 is a circuit diagram of the electric compressor driving apparatus of a fourth embodiment in accordance with the present invention.

FIG. 4 is a circuit diagram of the electric compressor driving apparatus of the fourth embodiment in accordance with the present invention. In the electric compressor driving apparatus of the fourth embodiment, the comparator 5, the operational amplifier 7 and the resistor 8 are connected to a switching power supply 31 of an isolation type. The switching power supply 31 of the isolation type is fed with D.C. current from the batteries 16 for electrical equipments in the automobile. Other elements are similar to those of the electric compressor driving apparatus in the second embodiment as shown in FIG. 2, and description is omitted.

In the fourth embodiment, an abnormally high voltage due to regenerative breaking or an abnormally low voltage due to overload in acceleration step does not influence the power supply voltage of the comparator 5, the operational amplifier 7 and the resistor 8, and therefore, stable operation is realizable.

[Fifth embodiment]

Fifth embodiment is described with reference to FIG. 5 and FIG. 6.

Figure 5:
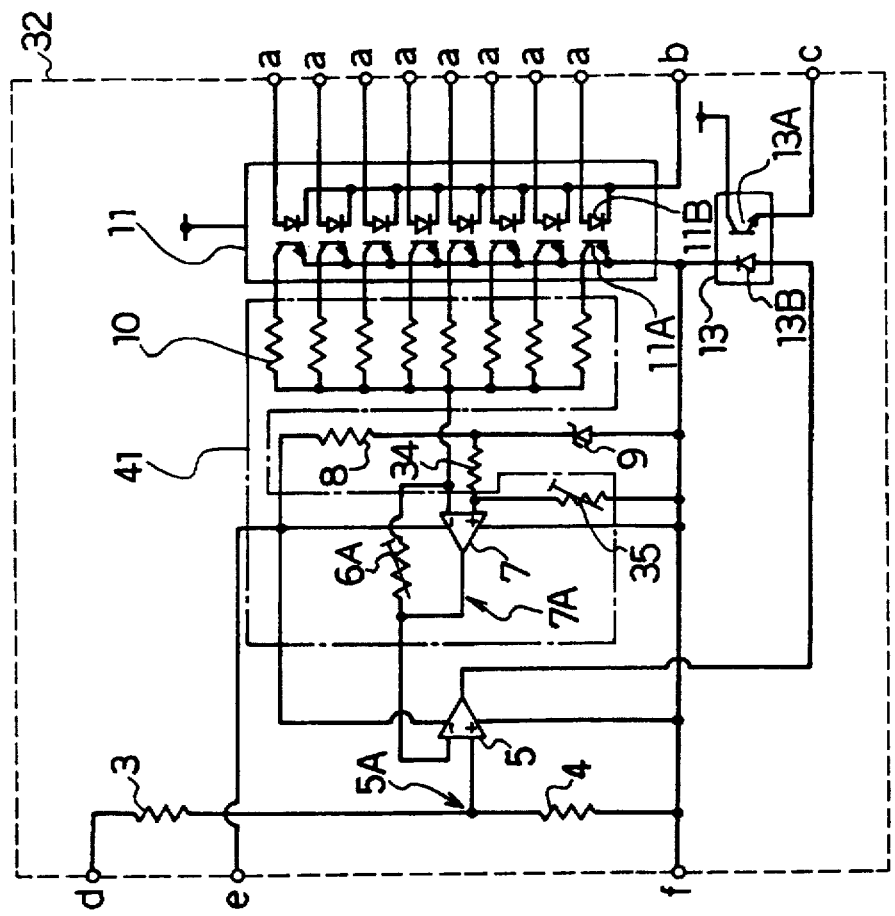
FIG. 5 is a circuit diagram of the voltage detection circuit of a fifth embodiment in accordance with the present invention.

FIG. 5 is a circuit diagram of a voltage detection circuit unit 32 of the fifth embodiment in accordance with the present invention.

The voltage detection circuit unit 32 as shown in FIG. 5 is a part of the voltage detection circuit 40 from which the microcomputer 14 is removed.

The reference voltage applied to the noninvert input (+) of the operational amplifier 7 is a voltage of which the voltage of 10 V of the zener diode 9 is divided by a resistor 34 and a variable resistor 35. A variable resistor 6A is connected across the invert input (−) and the output terminal of the operational amplifier 7.

Figure 6:
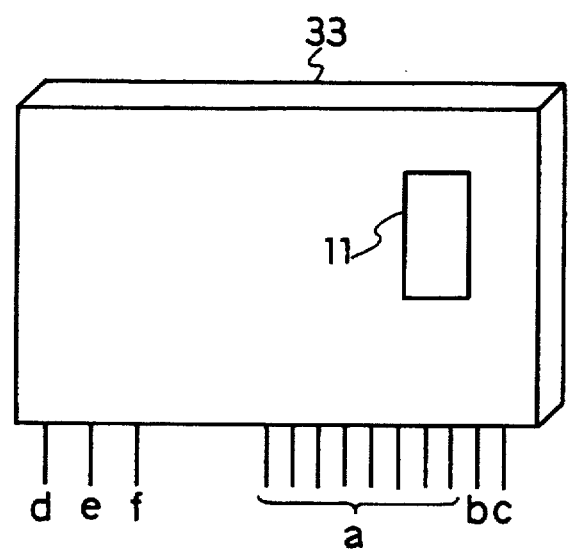
FIG. 6 is a perspective view of a circuit block.

FIG. 6 is a perspective view of a circuit block 33 of the voltage detection circuit unit 32 in FIG. 5. The voltage detection circuit unit 32 as shown in FIG. 5 is enclosed in the circuit block 33 as shown in FIG. 6. Terminals d and f to be connected to the batteries 1 and a terminal e to be connected to the switching power supply 2 are disposed leftward on the bottom of the circuit block 33. Terminals a, b and c to be connected to the microcomputer 14 are disposed rightward on the bottom of the circuit block 33. Therefore, insulation between the terminals d, e, f to be connected to the batteries 1 and the terminals a, b, c to be connected to the microcomputer 14 is assured by a separation arrangement.

In the voltage detection circuit unit 32, a voltage measurement range of the batteries 1 is variable through changing of the reference voltage by the variable resistor 35 and changing of a resistance ratio by the variable resistor 6A. Therefore, the circuit block 33 is applicable to various battery for the driving motor and various electric compressor driving apparatus as a common element. Moreover, a space is reduced by mounting the circuit block 33 on a control circuit substrate of an automobile by using the terminals a, b, c, d, e and f.

The electric compressor driving apparatus in the aforementioned embodiments are applicable to an electric compressor of a hybrid automobile provided with a high voltage D.C. generator driven by a gasoline engine in addition to the battery 1.

According to the above-mentioned embodiments, the direct-current voltage itself can be detected by comparing the divided voltage of the direct-current voltage with the comparison voltage, changing the comparison voltage. Moreover, many circuits such as a high voltage detection circuit, a low voltage detection circuit and a voltage range detection circuit need not be separately disposed. Therefore, the space occupied by these circuits is reduced, the number of parts is reduced and heat generation decreases.

Furthermore, the waveform of the motor driving voltage is varied responding to the voltage of the batteries 1 with a high accuracy and in a wide voltage range, and the increase of current due to overexcitation or underexcitation is prevented.

On the other hand, since the value of the first direct-current voltage itself can be detected, an electric power consumption is accurately calculated by measuring a current of the first direct-current power supply.

Moreover, the voltage detection circuit is strengthened against electric noise by setting the divided voltage and the comparison voltage rather high voltages by increasing the power supply voltage of the comparator and operational amplifier. The voltage detection circuit is suitable for the electric compressor driving apparatus which generally has considerable electric noise.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A driving apparatus for an automobile electric compressor comprising:

first voltage source means for supplying electric power to an electric compressor driven by said electric compressor driving apparatus;

second voltage source means electrically isolated from said first voltage source means;

voltage detection means for detecting a first DC voltage of said first voltage source means, the voltage detection means comprising:

computer means electrically isolated from the first voltage source means and connected to said second voltage source means to receive electric power, the computer means having plural output ports for issuing output signals and an input port for receiving an input signal, photocoupler means having a plural number of light emission means connected to each output port of said computer means, and the same plural number of light sensing means connected to the ground at one terminals thereof and respectively coupled with said light emission means, plural resistors connected to said light sensing means at one terminal respectively, and connected in common at the other terminal thereof, a voltage amplifier for outputting a comparison voltage, connected to said terminal connected in common of said resistors by the invert input (−) thereof, and to a direct-current power source having a constant reference voltage by the noninvert input (+) thereof, and having a resistor connected across the invert input (−) and the output terminal thereof, a comparator connected to said output terminal of said voltage amplifier by the invert input (−) thereof and to said first voltage source means through resistors for dividing the voltage of said first voltage source means by the noninvert input (+) thereof; and a photocoupler having light emission means connected between the output terminal of said comparator and the ground, and light sensing means coupled with said light emission means and connected between said second voltage source means and said input port of said computer means; and an electric motor driving circuit for driving said electric compressor, connected to an output port of said computer means through an electrical insulation means.

2. A driving apparatus for an automobile electric compressor in accordance with claim 1, wherein the gain of said voltage amplifier is adjusted by changing a ratio between a resistance value of a fixed resistor and a resistance value of a variable resistor, said ratio being changed by changing the resistance value of said variable resistor, said changing of said resistance value being made by parallel-connecting at least one resistor selected from plural resistors having said respective resistance values which are represented by the n-th power of 2 (n: natural number).

3. A driving apparatus for an automobile electric compressor in accordance with claim 1, wherein said computer means outputs output signals for limiting an adjustment range of said gain of said voltage amplifier, and an operation in said computer means is carried out at predetermined time intervals which are required to protect a circuit in said electric compressor driving apparatus and said electric compressor.

4. A driving apparatus for an automobile electric compressor in accordance with claim 1, wherein electric power of said comparator and said voltage amplifier is supplied from said second voltage source means through electrical isolation means.

5. A driving apparatus for an automobile electric compressor in accordance with claim 1, wherein said voltage amplifier comprises a variable resistor for varying said reference voltage and another variable resistor for varying said gain thereof, and said voltage amplifier, said comparator, said photocoupler and said variable resistors are mounted on a substrate having connection terminals.

6. An electric compressor driving apparatus for automobile in accordance with claim 1, wherein in the case that the output of said first voltage source means lowers and supply of electric power to said comparator and said voltage amplifier is suspended, comparison result between said divided voltage of said first direct-current voltage and said comparison voltage indicates that the output of said first voltage source is substantially zero.

7. In a compressor driving apparatus for driving an automobile air conditioning compressor which is mounted on an automobile, the automobile having a first voltage source means for generating a first DC voltage, a second voltage source means electrically isolated from the first voltage source means for generating a second DC voltage, and voltage detection means for detecting a DC voltage of the first voltage source means, said voltage detection means comprising:

a comparator for comparing a divided voltage of the first DC voltage with an adjustable comparison reference voltage and outputting a comparison output of a logical high level signal when a noninvert input voltage (+) is higher than an invert input voltage (−), or a logical low level signal when a noninvert input voltage (+) is lower than an invert input voltage (−), a first photocoupler for transmitting the comparison output, computer means electrically isolated from the first voltage source means for detecting the first DC voltage from the output of the first photocoupler and the adjustable comparison reference voltage, and outputting a voltage value of the first voltage source means, a second photocoupler for transmitting the output of the computer means, and a voltage amplifier for amplifying a predetermined reference voltage by changing a gain based on the output of the second photocoupler, the voltage amplifier outputting the adjustable comparison reference voltage for use by the comparator, wherein the gain of said voltage amplifier is adjusted by changing a ratio between a resistance value of a fixed resistor and a resistance value of a variable resistor, said ratio being changed by changing the resistance value of said variable resistor, said changing of said resistance value being made by parallel-connecting at least one resistor selected from plural resistors having said respective resistance values which are represented by the n-th power of 2 (n: natural number).

8. In a compressor driving apparatus in accordance with claim 7, said voltage detection means further comprises a counter having a predetermined number of binary digits, and said changing of the resistance value is performed on the basis of the outputs of said predetermined number of binary digits of said counter activated by input of a clock signal and reset by input of a reset signal.

9. In a compressor driving apparatus in accordance with claim 7, said voltage amplifier comprises a variable resistor for varying said reference voltage and another variable resistor for varying said gain thereof, and said voltage amplifier, said comparator, said first and second photocouplers and said variable resistors are mounted on a substrate having connection terminals.

10. In a compressor driving apparatus for driving an automobile air conditioning compressor which is mounted on an automobile, the automobile having a first voltage source means for generating a first DC voltage, a second voltage source means electrically isolated from the first voltage source means for generating a second DC voltage, and voltage detection means for detecting a DC voltage of the first voltage source means, said voltage detection means comprising:

a comparator for comparing a divided voltage of the first DC voltage with an adjustable comparison reference voltage and outputting a comparison output of a logical high level signal when a noninvert input voltage (+) is higher than an invert input voltage (−), or a logical low level signal when a noninvert input voltage (+) is lower than an invert input voltage (−), a first photocoupler for transmitting the comparison output, computer means electrically isolated from the first voltage source means for detecting the first DC voltage from the output of the first photocoupler and the adjustable comparison reference voltage, and outputting a voltage value of the first voltage source means, a second photocoupler for transmitting the output of the computer means, and a voltage amplifier for amplifying a predetermined reference voltage by changing a gain based on the output of the second photocoupler, the voltage amplifier outputting the adjustable comparison reference voltage for use by the comparator, wherein said computer means outputs output signals for limiting an adjustment range of said gain of said voltage amplifier, and an operation in said computer means is carried out at predetermined time intervals which are required to protect a circuit in said electric compressor driving apparatus and said electric compressor.

11. A driving apparatus for an automobile electric compressor comprising:

a first voltage source means for supplying electric power to an electric compressor driven by said electric compressor driving apparatus;

a second voltage source means electrically isolated from said first voltage source means;

a voltage detection means for detecting a first DC voltage of said first voltage source means, the voltage detection means comprising:

computer means electrically isolated from the first voltage source means and connected to said second voltage source means to receive electric power, the computer means having plural output ports for issuing output signals and an input port for receiving an input signal, a counter having output terminals of a predetermined number of binary digits and counting a clock signal from clock signal generation means, photocoupler means having a plural number of light emission means connected to each output of said counter, and the same plural number of light sensing means respectively coupled with said light emission means so as to receive the light of said light emission means, plural resistors connected to said light sensing means at one terminal, respectively and connected in common at the other terminals thereof, a voltage amplifier for outputting a comparison voltage, connected to said terminal connected in common of said resistors by the invert input (−) thereof, and to a direct-current power source having a constant reference voltage at the noninvert input (+) thereof, and having a resistor connected across the invert input (−) and the output terminal thereof, a comparator connected to said output terminal of said voltage amplifier by the invert input (−) thereof, and to said first voltage source means through resistors for dividing the voltage of said first voltage source means by the noninvert input (+) thereof, and a photocoupler having light emission means connected between the output terminal of said comparator and the ground, and light sensing means coupled with said light emission means and connected between said second voltage source means and said input port of said computer means; and an electric motor driving circuit for driving said electric compressor, connected to an output port of said computer means through an electrical insulation means.

12. A driving apparatus for an automobile electric compressor in accordance with claim 11, wherein electric power of said comparator and said voltage amplifier are supplied from said second voltage source means through electrical isolation means.

13. A driving apparatus for an automobile electric compressor in accordance with claim 11, wherein said voltage amplifier comprises a variable resistor for varying said reference voltage and another variable resistor for varying said gain thereof, and said voltage amplifier, said comparator, said photocoupler and said variable resistors are mounted on a substrate having connection terminals.

14. An electric compressor driving apparatus for automobile in accordance with claim 11, wherein in the case that the output of said first voltage source means lowers and supply of electric power to said comparator and said voltage amplifier is suspended, comparison result between said divided voltage of said first direct-current voltage and said comparison voltage indicates that the output of said first voltage source is substantially zero.

15. In a compressor driving apparatus for driving an automobile air conditioning compressor which is mounted on an automobile, the automobile having a first voltage source means for generating a first DC voltage, a second voltage source means electrically isolated from the first voltage source means for generating a second DC voltage, and voltage detection means for detecting a DC voltage of the first voltage source means, said voltage detection means comprising:

- a comparator for comparing a divided voltage of the first DC voltage with an adjustable comparison reference voltage and outputting a comparison output of a logical high level signal when a noninvert input voltage (+) is higher than an invert input voltage (−), or a logical low level signal when a noninvert input voltage (+) is lower than an invert input voltage (−),
- a first photocoupler for transmitting the comparison output,
- computer means electrically isolated from the first voltage source means for detecting the first DC voltage from the output of the first photocoupler and the adjustable comparison reference voltage, and outputting a voltage value of the first voltage source means,
- a second photocoupler for transmitting the output of the computer means, and
- a voltage amplifier for amplifying a predetermined reference voltage by changing a gain based on the output of the second photocoupler, the voltage amplifier outputting the adjustable comparison reference voltage for use by the comparator,
- wherein electric power of said comparator and said voltage amplifier is supplied from said second voltage source means through electrical isolation means.

16. In a compressor driving apparatus for driving an automobile air conditioning compressor which is mounted on an automobile, the automobile having a first voltage source means for generating a first DC voltage, a second voltage source means electrically isolated from the first voltage source means for generating a second DC voltage, and voltage detection means for detecting a DC voltage of the first voltage source means, said voltage detection means comprising:

- a comparator for comparing a divided voltage of the first DC voltage with an adjustable comparison reference voltage and outputting a comparison output of a logical high level signal when a noninvert input voltage (+) is higher than an invert input voltage (−), or a logical low level signal when a noninvert input voltage (+) is lower than an invert input voltage (−),
- a first photocoupler for transmitting the comparison output,
- computer means electrically isolated from the first voltage source means for detecting the first DC voltage from the output of the first photocoupler and the adjustable comparison reference voltage, and outputting a voltage value of the first voltage source means,
- a counter for receiving a clock signal and outputting output signals corresponding to the input of the clock signal,
- a voltage amplifier for amplifying a predetermined reference voltage by changing a gain based on the output signals of the counter, the voltage amplifier outputting the adjustable comparison reference voltage for use by the comparator, and

- second photocouplers for transmitting the output signals of the counter to the computer means,
- wherein electric power of said comparator and said voltage amplifier are supplied from said second voltage source means through electrical isolation means.

17. In a compressor driving apparatus for driving an automobile air conditioning compressor which is mounted on an automobile, the automobile having a first voltage source means for generating a first DC voltage, a second voltage source means electrically isolated from the first voltage source means for generating a second DC voltage, and voltage detection means for detecting a DC voltage of the first voltage source means, said voltage detection means comprising:

- a comparator for comparing a divided voltage of the first DC voltage with an adjustable comparison reference voltage and outputting a comparison output of a logical high level signal when a noninvert input voltage (+) is higher than an invert input voltage (−), or a logical low level signal when a noninvert input voltage (+) is lower than an invert input voltage (−),
- a first photocoupler for transmitting the comparison output,
- computer means electrically isolated from the first voltage source means for detecting the first DC voltage from the output of the first photocoupler and the adjustable comparison reference voltage, and outputting a voltage value of the first voltage source means,
- a second photocoupler for transmitting the output of the computer means, and
- a voltage amplifier for amplifying a predetermined reference voltage by changing a gain based on the output of the second photocoupler, the voltage amplifier outputting the adjustable comparison reference voltage for use by the comparator,
- wherein if the output of said first voltage source means lowers and supply of electric power to said comparator and said voltage amplifier is suspended, a comparison of the divided voltage of the first DC voltage with the adjustable comparison reference voltage indicates that the output of said first voltage source means is substantially zero.

18. In a compressor driving apparatus for driving an automobile air conditioning compressor which is mounted on an automobile, the automobile having a first voltage source means for generating a first DC voltage, a second voltage source means electrically isolated from the first voltage source means for generating a second DC voltage, and voltage detection means for detecting a DC voltage of the first voltage source means, said voltage detection means comprising:

- a comparator for comparing a divided voltage of the first DC voltage with an adjustable comparison reference voltage and outputting a comparison output of a logical high level signal when a noninvert input voltage (+) is higher than an invert input voltage (−), or a logical low level signal when a noninvert input voltage (+) is lower than an invert input voltage (−),
- a first photocoupler for transmitting the comparison output,
- computer means electrically isolated from the first voltage source means for detecting the first DC voltage from the output of the first photocoupler and the adjustable comparison reference voltage, and outputting a voltage value of the first voltage source means, a counter for receiving a clock signal and outputting output signals corresponding to the input of the clock signal, a voltage amplifier for amplifying a predetermined reference voltage by changing a gain based on the output signals of the counter, the voltage amplifier outputting the adjustable comparison reference voltage for use by the comparator, and second photocouplers for transmitting the output signals of the counter to the computer means, wherein if the output of said first voltage source means lowers and supply of electric power to said comparator and said voltage amplifier is suspended, a comparison of the divided voltage of the first DC voltage with the adjustable comparison reference voltage indicates that the output of said first voltage source means is substantially zero.

19. In a compressor driving apparatus for driving an automobile air conditioning compressor which is mounted on an automobile, the automobile having a first voltage source means for generating a first DC voltage, a second voltage source means electrically isolated from the first voltage source means for generating a second DC voltage, and voltage detection means for detecting a DC voltage of the first voltage source means, said voltage detection means comprising:

a comparator for comparing a divided voltage of the first DC voltage with an adjustable comparison reference voltage and outputting a comparison output of a logical high level signal when a noninvert input voltage (+) is higher than an invert input voltage (−), or a logical low level signal when a noninvert input voltage (+) is lower than an invert input voltage (−), a first photocoupler for transmitting the comparison output, computer means electrically isolated from the first voltage source means for detecting the first DC voltage from the output of the first photocoupler and the adjustable comparison reference voltage, and outputting a voltage value of the first voltage source means, a second photocoupler for transmitting the output of the computer means, and a voltage amplifier for amplifying a predetermined reference voltage by changing a gain based on the output of the second photocoupler, the voltage amplifier outputting the adjustable comparison reference voltage for use by the comparator, wherein said voltage amplifier comprises a variable resistor for varying said reference voltage and another variable resistor for varying said gain thereof, and said voltage amplifier, said comparator, said first and second photocouplers and said variable resistors are mounted on a substrate having connection terminals.

20. In a compressor driving apparatus for driving an automobile air conditioning compressor which is mounted on an automobile, the automobile having a first voltage source means for generating a first DC voltage, a second voltage source means electrically isolated from the first voltage source means for generating a second DC voltage, and voltage detection means for detecting a DC voltage of the first voltage source means, said voltage detection means comprising:

a comparator for comparing a divided voltage of the first DC voltage with an adjustable comparison reference voltage and outputting a comparison output of a logical high level signal when a noninvert input voltage (+) is higher than an invert input voltage (−), or a logical low level signal when a noninvert input voltage (+) is lower than an invert input voltage (−), a first photocoupler for transmitting the comparison output, computer means electrically isolated from the first voltage source means for detecting the first DC voltage from the output of the first photocoupler and the adjustable comparison reference voltage, and outputting a voltage value of the first voltage source means, a counter for receiving a clock signal and outputting output signals corresponding to the input of the clock signal, a voltage amplifier for amplifying a predetermined reference voltage by changing a gain based on the output signals of the counter, the voltage amplifier outputting the adjustable comparison reference voltage for use by the comparator, and second photocouplers for transmitting the output signals of the counter to the computer means, wherein said voltage amplifier comprises a variable resistor for varying said reference voltage and another variable resistor for varying said gain thereof, and said voltage amplifier, said comparator, said first and second photocouplers and said variable resistors are mounted on a substrate having connection terminals.

* * * * *